US012767430B2

(12) United States Patent
Wegner et al.

(10) Patent No.: US 12,767,430 B2
(45) Date of Patent: Oct. 20, 2026

(54) TRASH CAN

(71) Applicant: Kohler Co., Kohler, WI (US)

(72) Inventors: Matthew R. Wegner, Sheboygan, WI (US); Christopher M. Shay, Sheboygan, WI (US)

(73) Assignee: Kohler Co., Kohler, WI (US)

( * ) Notice: Subject to any disclaimer, the term of this patent is extended or adjusted under 35 U.S.C. 154(b) by 0 days.

(21) Appl. No.: 18/889,981

(22) Filed: Sep. 19, 2024

(65) Prior Publication Data

US 2025/0011075 A1 Jan. 9, 2025

Related U.S. Application Data

(63) Continuation of application No. 17/703,823, filed on Mar. 24, 2022, now Pat. No. 12,098,025, which is a continuation of application No. 16/150,620, filed on Oct. 3, 2018, now Pat. No. 11,634,276.

(60) Provisional application No. 62/587,973, filed on Nov. 17, 2017.

(51) Int. Cl.

*B65F 1/08* (2006.01)
*B65F 1/00* (2006.01)
*B65F 1/06* (2006.01)
*B65F 1/16* (2006.01)

(52) U.S. Cl.

CPC .............. *B65F 1/08* (2013.01); *B65F 1/0053* (2013.01); *B65F 1/06* (2013.01); *B65F 1/163* (2013.01); *B65F 1/1646* (2013.01); *B65F 2001/1661* (2013.01); *B65F 2250/11* (2013.01); *B65F 2250/112* (2013.01)

(58) Field of Classification Search

CPC .. B65F 1/08; B65F 1/0053; B65F 1/06; B65F 1/163; B65F 1/1646; B65F 1/0073; B65F 1/16; B65D 43/262; B65D 43/26

USPC ..................................................... 220/495.06

See application file for complete search history.

(56) References Cited

U.S. PATENT DOCUMENTS

| | | | | |
|---|---|---|---|---|
| 11,338,994 B2 * | 5/2022 | Wang | B65F 1/1638 | |
| 12,098,025 B2 * | 9/2024 | Wegner | B65F 1/0053 | |
| 2008/0000912 A1 * | 1/2008 | Lin | B65F 1/06 | 220/495.08 |
| 2010/0147865 A1 * | 6/2010 | Yang | B65F 1/04 | 220/810 |

* cited by examiner

*Primary Examiner* — Robert Poon
(74) *Attorney, Agent, or Firm* — Husch Blackwell LLP

(57) ABSTRACT

A trash can that includes a frame, a liner, and a lid. The frame has a base and a casing supported on the base. The liner is removably disposed within a cavity of the casing. The lid is coupled to and rotatable relative to the frame between a closed position, in which the liner is concealed, and an open position, in which the liner is accessible. The lid is rotatably coupled to the frame by a hinge, such that the hinge and the lid do not extend rearward a rear surface of the casing in the open position.

14 Claims, 18 Drawing Sheets

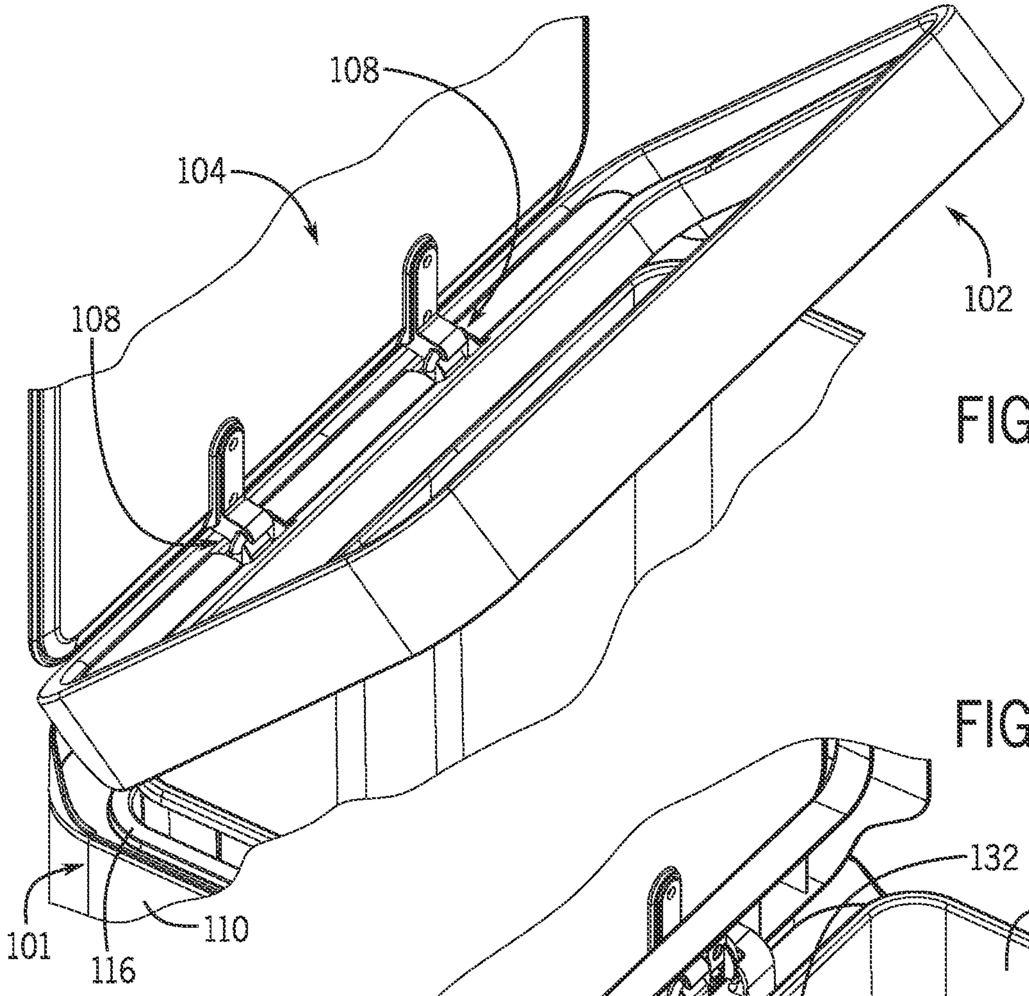
FIG. 9
FIG. 10
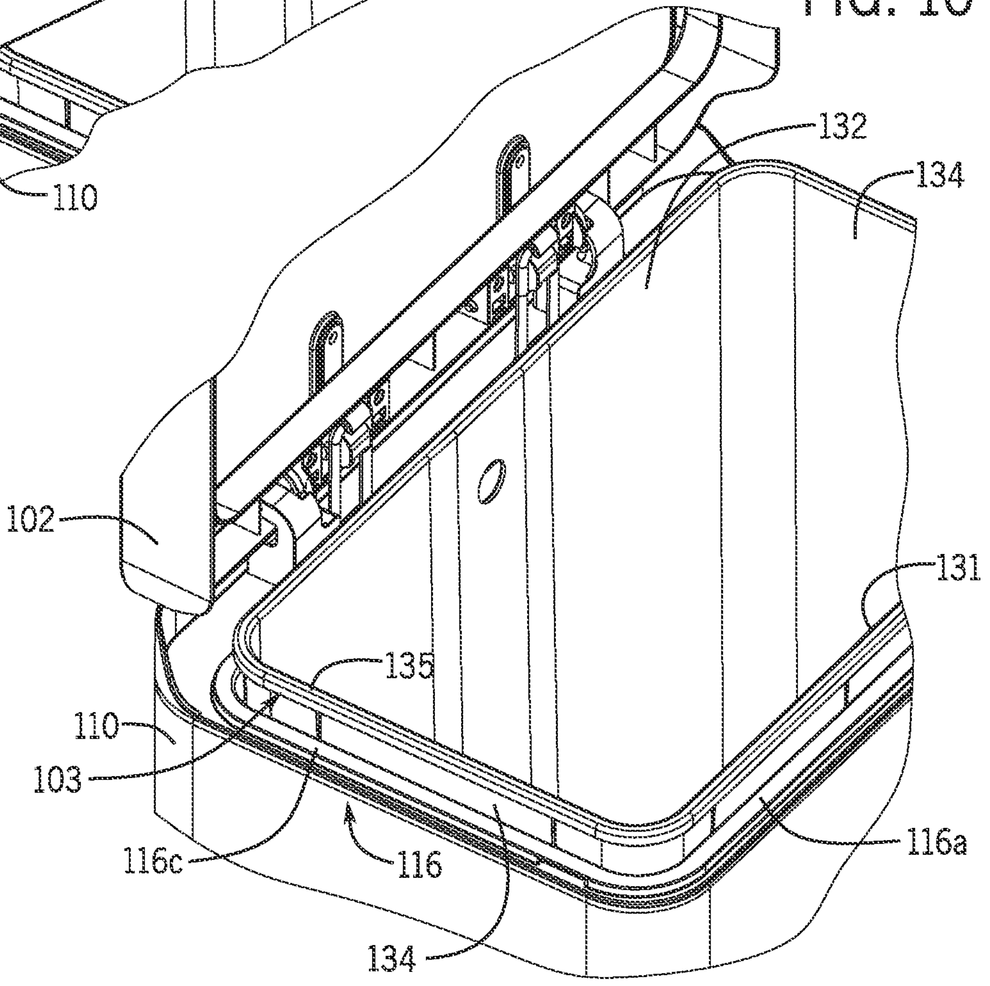

TRASH CAN

CROSS-REFERENCE TO RELATED APPLICATIONS

This application is a continuation of U.S. patent application Ser. No. 17/703,823, filed Mar. 24, 2022, which is a continuation of U.S. patent application Ser. No. 16/150,620 filed Oct. 3, 2018, now U.S. Pat. No. 11,634,276, which claims the benefit of and priority to U.S. Provisional Patent Application No. 62/587,973, which was filed on Nov. 17, 2017, which applications are incorporated by reference herein in their entireties.

BACKGROUND

The present application relates generally to the field of trash cans. More specifically, this application relates to trash cans having removable liners.

SUMMARY

At least one embodiment of the application relates to a trash can having a frame, a liner, and a lid. The frame includes a base and a casing supported on the base. The liner is removably disposed within a cavity of the casing and has a bottom that rests directly on the base in the cavity. For example, the bottom of the liner can rest directly on a top wall of the base. The lid is coupled to and is rotatable relative to the frame between a closed position, in which the liner is concealed, and an open position, in which the liner is accessible, such as to remove and/or replace a trash bag coupled to the liner.

At least one embodiment relates to a trash can having a frame, a liner that is removable from the frame and is configured to receive a trash bag, a hinge, a bag cover, and a lid. The frame includes a base, a casing supported on the base, and an upper support coupled to the top of the casing and disposed within a cavity of the casing. The removable liner extends through an opening in the upper support and is disposed within the cavity of the casing. The hinge includes a support mount fixedly coupled to the upper support, a pivot pin extending through a bore in the support mount, a lid mount rotatably coupled to the pivot pin, and a cover mount rotatably coupled to the pivot pin. The bag cover is fixedly coupled to the cover mount so that the bag cover and the cover mount are rotatable relative to the upper support between an open position and a closed position. The lid is fixedly coupled to the lid mount so that the lid and the lid mount are rotatable relative to the upper support between an open position and a closed position.

At least one embodiment relates to a trash can having a frame, a liner that is removable from the frame, and a lid. The frame includes a base, a casing supported on the base, and an upper support coupled to the top of the casing and disposed within a cavity of the casing. The removable liner extends through an opening in the upper support and is disposed within the cavity of the casing such that a top of the liner extends above (e.g., beyond, past, etc.) a top of the casing. The lid is coupled to and is rotatable relative to the frame between a closed position, in which the liner is concealed, and an open position, in which the liner is accessible.

At least one embodiment relates to a trash can having a frame that includes a base and a casing supported on the base; a liner removably disposed within a cavity of the casing; a lid coupled to and rotatable relative to the frame between a closed position, in which the liner is concealed, and an open position, in which the liner is accessible; and a bag cover coupled to the frame and rotatable relative to the frame and the lid between a closed position, in which a top of the liner is concealed and the bag cover prevents the liner from being removed from the casing, and an open position, in which the top of the liner is accessible and the liner is removable from the cavity of the casing.

At least one embodiment relates to a trash can having a frame that includes a base and a casing supported on the base; a liner removably disposed within a cavity of the casing; a bag cover coupled to and rotatable relative to the frame between a closed position, in which the bag cover conceals a top of the liner, and an open position, in which the top of the liner is accessible; a lid coupled to and rotatable relative to the frame between a closed position, in which the liner is concealed, and an open position, in which the liner is accessible through an opening in the bag cover; and a hinge that rotatably couples both the bag cover and the lid to the frame, wherein the hinge is located forward of a rear surface of the casing and forward of a rear surface of the bag cover, wherein the lid does not extend rearward of the rear surfaces of the casing and the bag cover in the open position, and wherein the bag cover does not extend rearward of the rear surface of the casing in the open position.

At least one embodiment relates to a trash can having a frame that includes a base and a casing supported on the base; a liner removably disposed within a cavity of the casing and having a bottom that is supported by the base; and a lid coupled to and rotatable relative to the frame between a closed position, in which the liner is concealed, and an open position, in which the liner is accessible. At least one of the base, the casing, the liner, and the lid includes a steel having a gloss level from 14 up to and including 29 at sixty degrees.

At least one embodiment relates to a trash can having a frame, a liner, a lid, and a hinge. The frame includes a base, a casing supported on the base, and an upper support coupled to the top of the casing and disposed within a cavity defined by the casing. The liner is removably disposed within the cavity and extends through an opening in the upper support. The lid is coupled to the frame and rotatable relative to the frame between a closed position, in which the liner is concealed, and an open position, in which the liner is accessible through the opening in the upper support. The hinge rotatably couples the lid to the frame, wherein the hinge and the lid do not extend rearward of a rear surface of the casing in the open position.

At least one embodiment relates to a trash can having a frame, a liner, and a lid. The frame includes a base and a casing supported on the base. The liner is removeably disposed within a cavity of the casing, the liner having walls and a top edge that protrudes above the casing. The top edge is spaced apart from the frame by a gap along an entire perimeter of the tope edge when the liner is fully installed within the casing. The lid is coupled to and rotatable relative to the frame between a closed position, in which the liner is concealed, and an open position, in which the liner is accessible.

BRIEF DESCRIPTION OF THE DRAWINGS

FIG. 9 is another perspective view of the trash can shown in FIG. 1 with the lid open and the bag cover partially open.

FIG. 10 is another perspective view of the trash can shown in FIG. 1 with the lid and the bag cover open.

DETAILED DESCRIPTION

Figure 2:
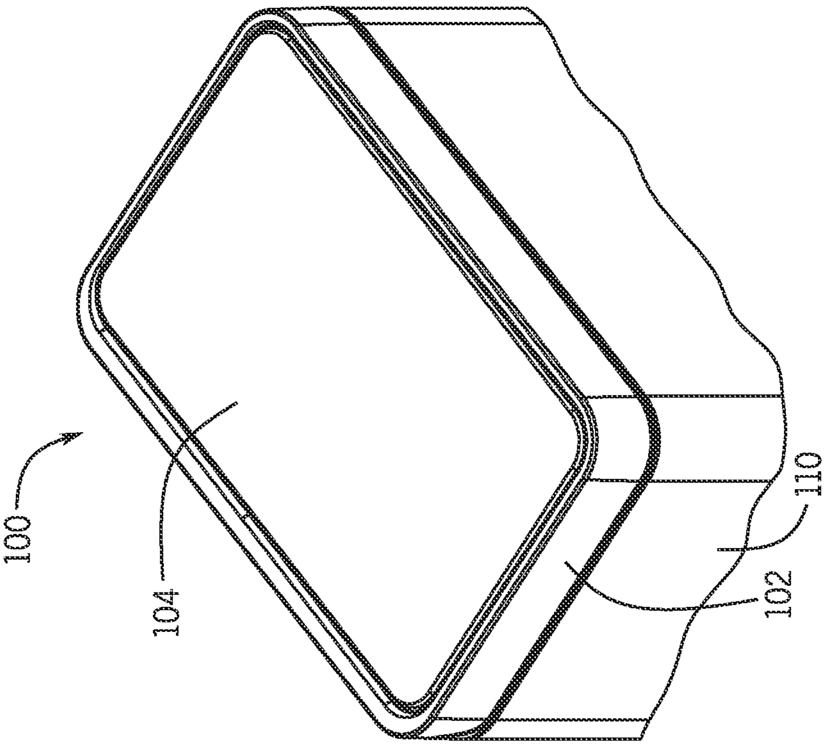
FIG. 2 is another perspective view of the trash can shown in FIG. 1.

Referring generally to the Figures, disclosed herein are trash cans (e.g., trash receptacles, trash containers, garbage cans, refuse receptacles, trash can assemblies, etc.) for use in residential, commercial, industrial, and other applicable settings. The trash cans have removable liners that advantageously rest on the base, which is on the floor, rather than an upper lip/ledge of the casing, and extend above an upper edge of the casing. This arrangement simplifies removing the full trash bag and replacing it with an empty one, since both can be performed without moving or removing the liner. The trash cans also have trash bag covers that advantageously pivot between a closed position, in which a top part of the trash bag is covered (e.g., concealed) and/or retained in place, and an open position, in which the trash bag is accessible for changing out the bag. Further, the pivot axis about which the bag cover rotates is coincident with the pivot axis about which the lid rotates, which advantageously reduces packaging space allowing for the pivot hinge to be relocated inside the casing and within the bag cover when closed. The trash cans also advantageously have lids that when rotated to the full open position are generally flush with or forward of a rear surface of the casing, which allows the trash can to be positioned right up to and against the wall. Other advantages will be evident from the description and Figures of this application.

FIGS. 1-27 illustrate an exemplary embodiment of a trash can 100 that includes a frame 101, a bag cover 102 pivotally coupled to the frame 101, a removable liner 103 disposed in a cavity of the frame 101 for receiving a trash bag/container, a lid 104 pivotally coupled to the frame 101 to provide access to the liner 103 (and trash bag) when open and prevent access when closed, and an actuation assembly 105 operatively coupled to the lid 104 to open the lid. The trash can 100 can optionally include other elements/components, as discussed below.

The frame 101 includes an outer casing 110 (e.g., shell), a lower support 111 that supports the casing 110 and rests on the floor or another supporting object, and an upper support 116 that is located proximate to a top of the casing 110 and supports the bag cover 102 and the lid 104. As shown best in FIGS. 1-5, the casing 110 has a hollow generally rectangular shape with a front wall 110*a*, a rear wall 110*b* opposite the front wall 110*a*, and two side walls 110*c* coupling the front and rear walls together. The casing 110 is open at the top and the bottom, and the casing 110 can be made of metal (e.g., stainless steel, aluminum, etc.), a polymer, a composite, or other suitable material.

Figure 13:
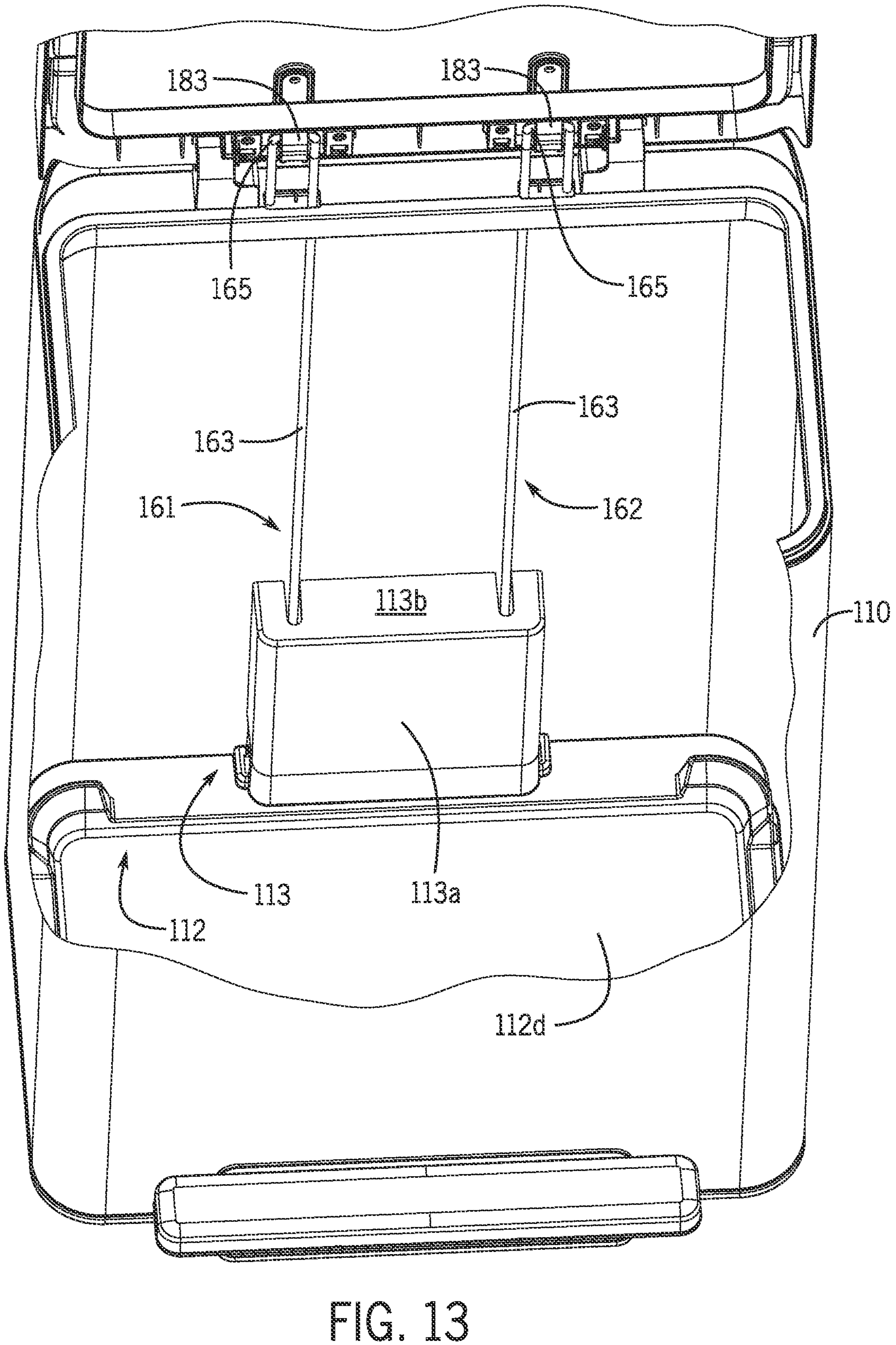
FIG. 13 is a perspective view of part of the inside of the trash can shown in FIG. 1 with the liner removed.
Figure 14:
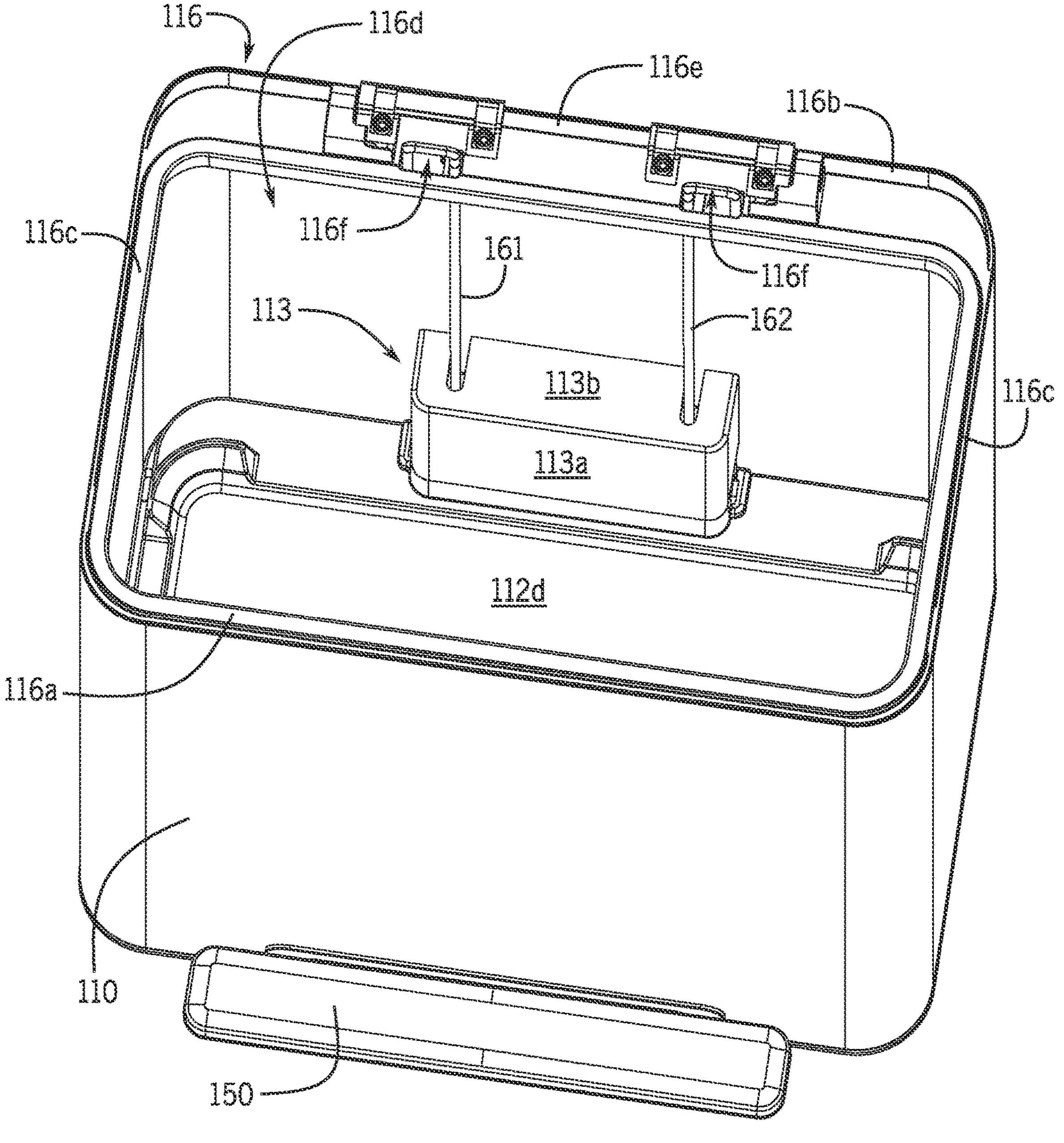
FIG. 14 is another perspective view of part of the inside of the trash can shown in FIG. 1 with the liner, bag cover, and lid removed.
Figure 15:
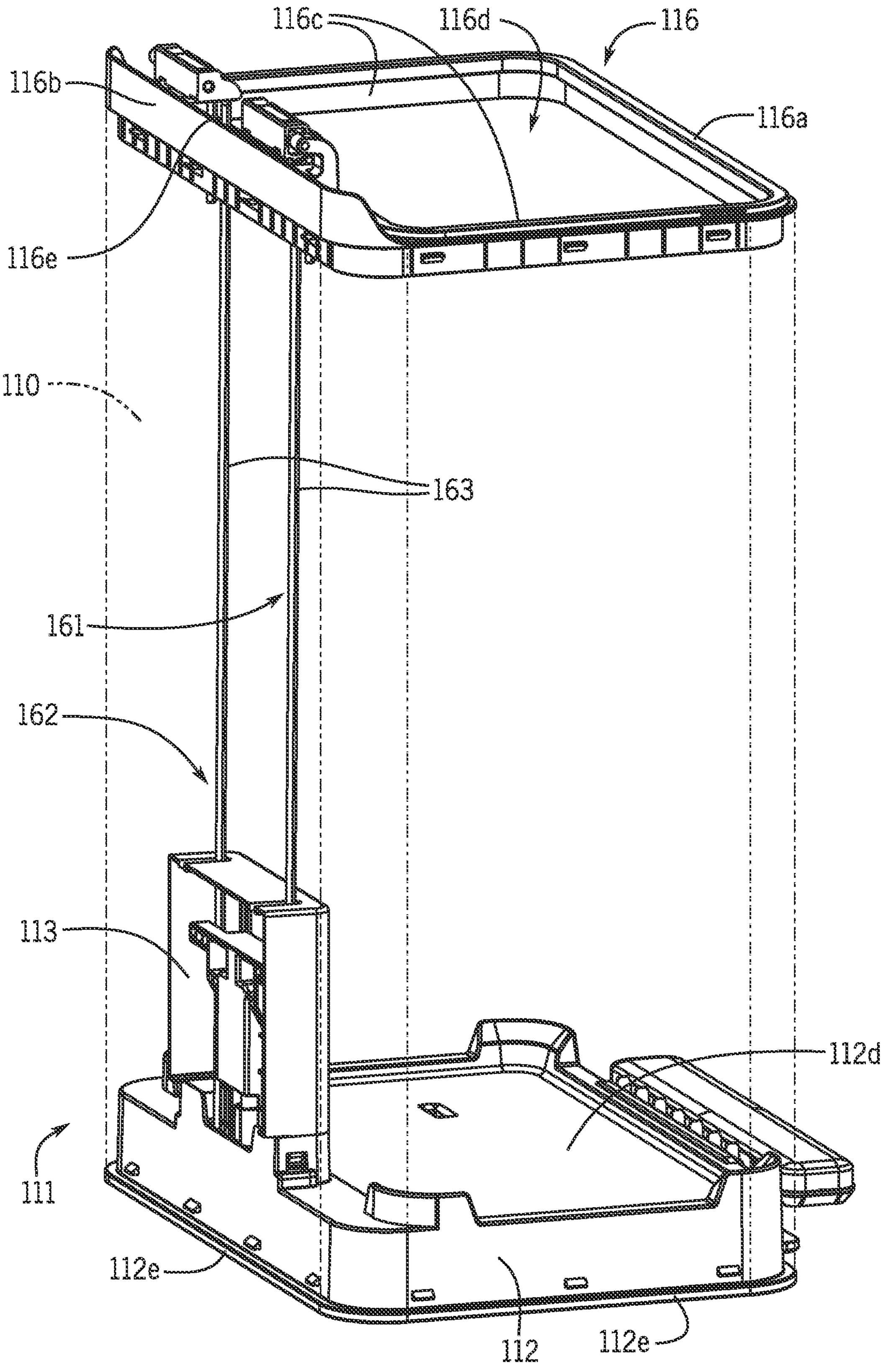
FIG. 15 is another perspective view of part of the inside of the trash can shown in FIG. 1 with the liner, bag cover, and lid removed.
Figure 16:
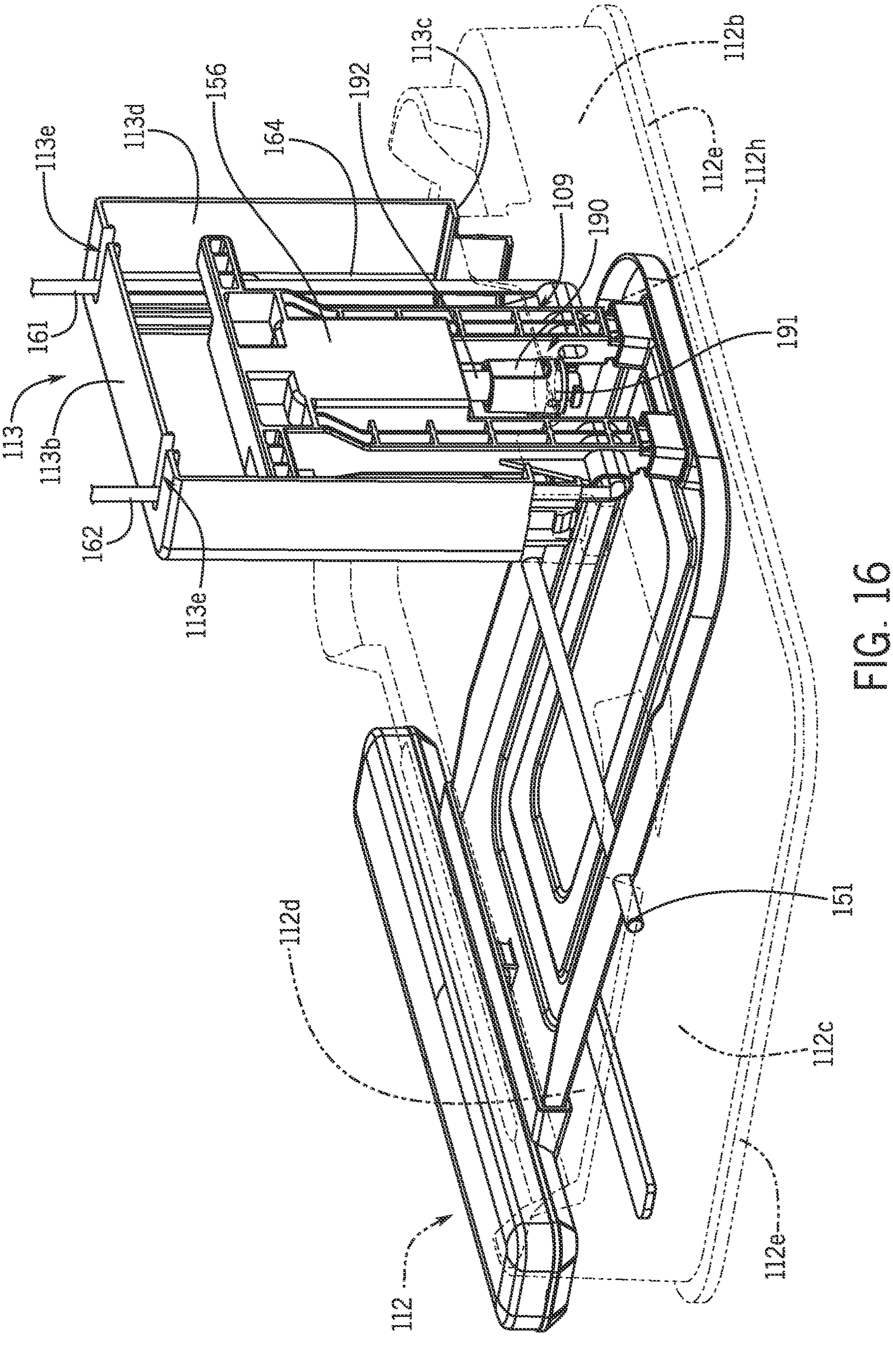
FIG. 16 is a top perspective view of the lower portion of the trash can shown in FIG. 1.
Figure 17:
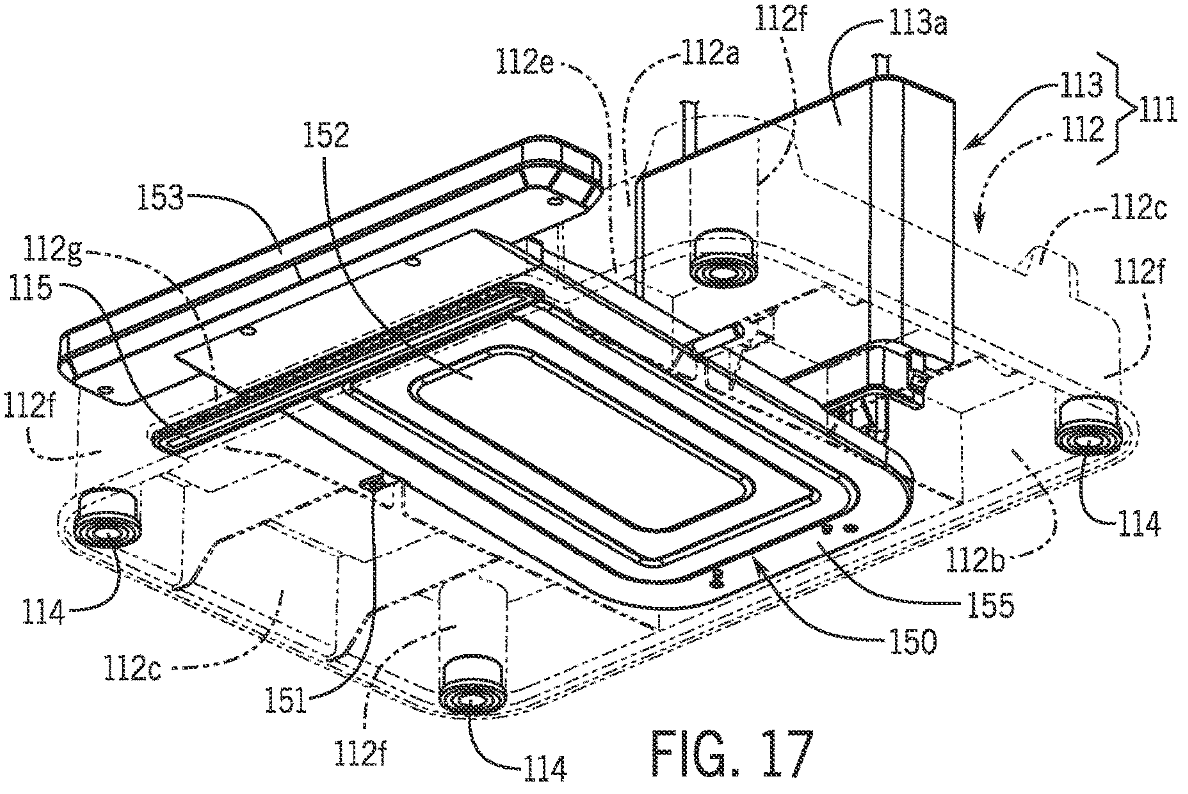
FIG. 17 is a bottom perspective view of the lower portion of the trash can shown in FIG. 1.
Figure 18:
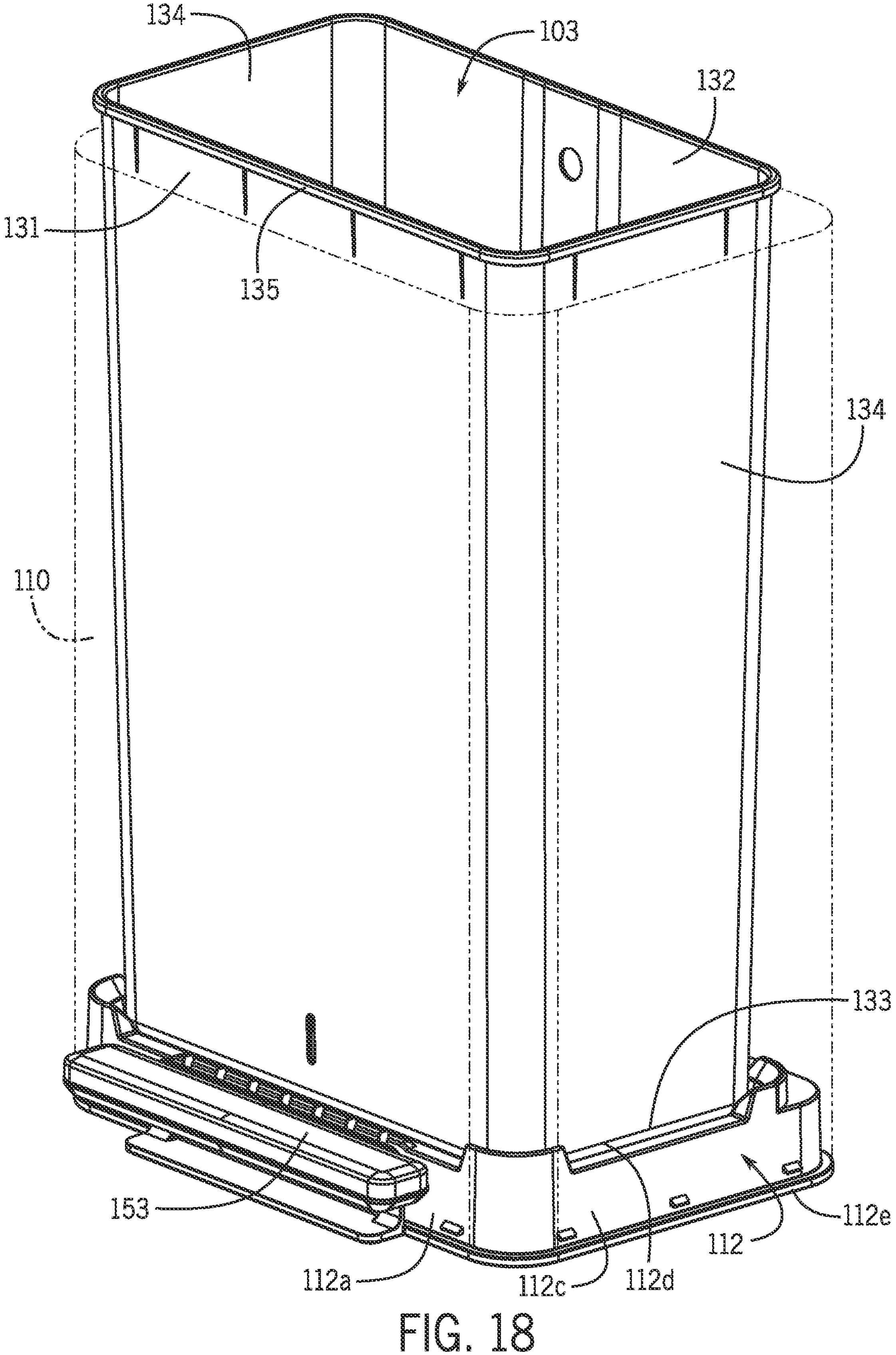
FIG. 18 is a perspective view of a portion of the trash can shown in FIG. 1.

As shown best in FIGS. 13-17, the lower support 111 includes a base 112, which rests on the floor (or other support object), and a cover 113 that is disposed on the base 112 at a rearward portion thereof to cover/protect a portion of the actuation assembly 105 and a damper if provided with the trash can 100. The cover 113 prevents interactions (e.g., contact) between the liner 103 and the pedal (and damper if provided with the assembly). The base 112 includes a front wall 112*a*, a rear wall 112*b* opposite the front wall 112*a*, two side walls 112*c* coupling the front and rear walls together, and a top wall 112*d* coupled to the tops of the front, rear, and side walls. As shown in FIG. 18, the top wall 112*d* supports a bottom of the liner 103 such that the liner 103 rests on the top wall 112*d* when assembled. As shown in FIG. 15, a flange 112*e* extends outwardly from the bottom of each of the front, rear and side walls 112*a*, 112*b*, 112*c* for supporting a bottom of the casing 110. The front, rear and side walls of the base 112 can be tapered outwardly moving from the top wall 112*d* toward the flange 112*e* to improve assembly between the casing 110 and the base 112. For example, the top of the walls of the base 112 can fit loosely with the casing 110, while the bottom of the walls can fit tightly with the casing 110, such as when the bottom of the casing 110 rests on the flange 112*e*. As shown in FIG. 17, the base 112 also includes a support post 112*f* located in each of four corners of the base 112. Each post 112*f* can contact the floor directly, or the lower support 111 can further include a compliant spacer 114 (e.g., grommet) disposed on the bottom of each post 112*f* (between the floor and the post). The spacer 114 can increase the friction to better hold the trash can 100 in position on the floor (or other support object) and/or can compress upon loading to allow the trash can 100 to sit on an uneven floor without rocking. The front wall 112*a* has an opening through which part of the pedal extends with a lower portion 112*g* of the front wall 112*a* supporting the pedal vertically. A compliant spacer 115 can optionally be coupled to the bottom of the lower portion 112*g* to contact the floor to increase the friction and/or compress upon loading, like each spacer 114. The base 112 can optionally include a recess 112*h* for receiving and supporting a damper if provided. As shown in FIG. 16, the recess 112*h* is cylindrical to receive a cylindrical part (e.g., housing) of the damper. However, it is noted that the shape of the recess can be tailored to the shape of the damper.

As shown in FIGS. 14-17, the cover 113 is generally a rectangular cuboid having a front wall 113*a*, a top wall 113*b*, a bottom wall 113*c* opposite the top wall 113*b*, and two opposing side walls 113*d* interconnecting the other walls of the cover 113. The bottom wall 113*c* of the cover 113 can be coupled to the top wall 112*d* of the base 112 to secure them together. It is noted that the cover 113 can be shaped differently than a rectangular cuboid. For example, the front wall 113*a* can be aligned at an oblique angle (when viewed from the side) relative to the bottom wall 113*c* to eliminate altogether or shorten the length of the top wall 113*b* to form a generally triangular prismatic shape. This arrangement can advantageously guide the liner 103 down to rest on the top wall 112*d* of the base 112. For example, gravity can pull the liner 103 along the oblique front wall 113*a* should a person try to incorrectly seat the bottom of the liner on the cover 113 rather than on the base 112. Each corner of the top wall 112*d* can include an upwardly extending projection to guide the liner 103 onto the top wall 112*d* and prevent the liner 103 from being able to rest on the cover 113. Disposed in the top wall 113*b* (or the front wall 112*a* if the top wall is too short or eliminated) is a slot 113*e* associated with a drive link (e.g., link arm 161, 162) of the actuation assembly 105 to allow the drive link to move relative to the cover 113 without the cover 113 retarding movement of the drive link. As shown in FIG. 16, each slot 113*e* is elongated in the fore and aft direction with one link arm 161, 162 passing through the slot 113*e*.

Figure 3:
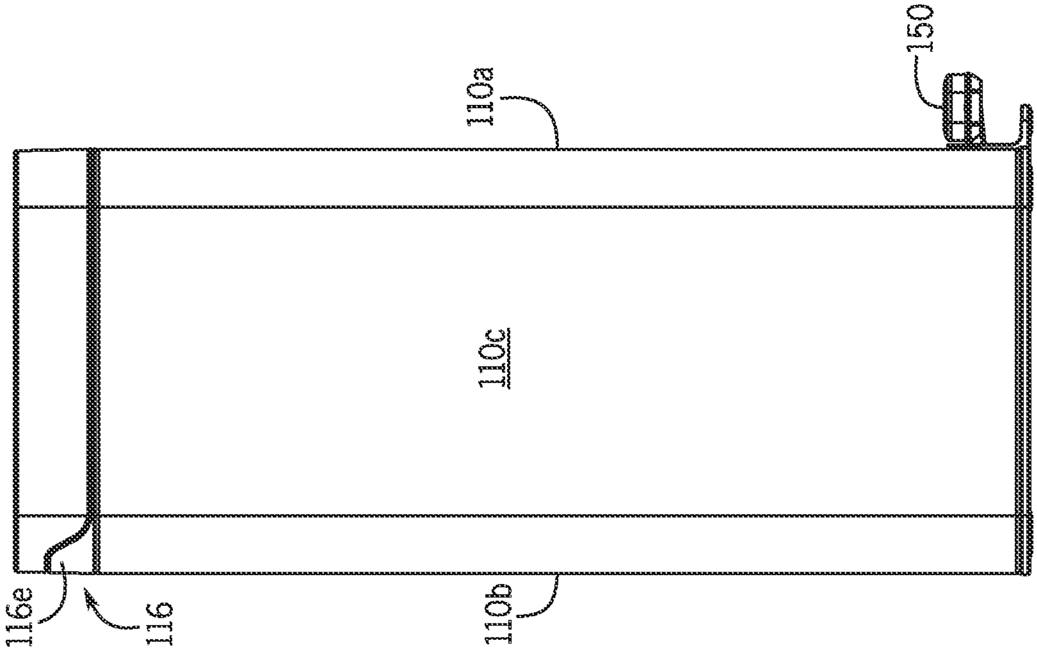
FIG. 3 is a side view of the trash can shown in FIG. 1.
Figure 5:
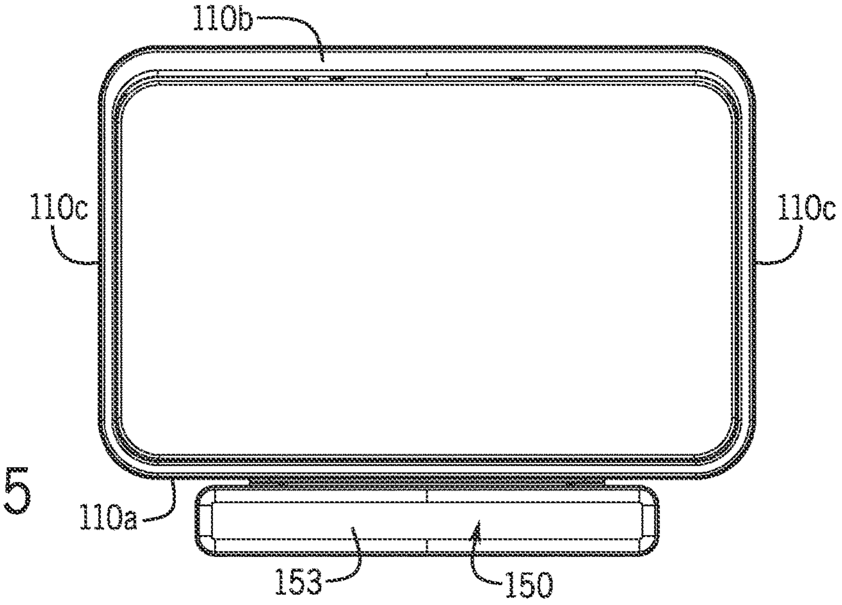
FIG. 5 is a top view of the trash can shown in FIG. 1.
Figure 19:
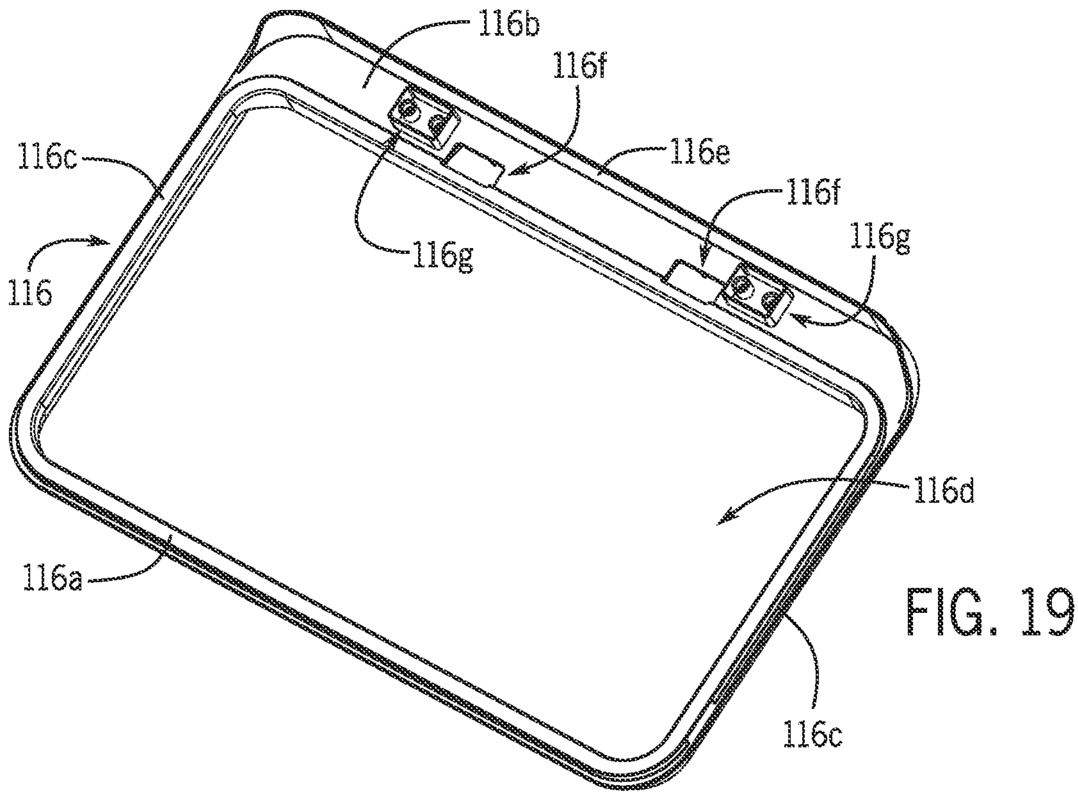
FIG. 19 is a perspective view of the rim of the trash can shown in FIG. 1.

As shown best in FIGS. 10, 14, 15, and 19, the upper support 116 is generally a rectangular member that is disposed within and coupled to the top of the casing 110 with an opening that receives the liner 103 when assembled. As shown in FIGS. 14, 15, and 19, the upper support 116 includes a front portion 116*a*, a rear portion 116*b*, and opposite side portions 116*c* interconnected together with an opening 116*d* between the portions for receiving the liner 103 (shown in FIGS. 10 and 11). Also shown in FIGS. 10 and 11, the front portion 116*a* and side portions 116*c* are horizontal flanges that rest on top of the casing 110 when assembled. The rear portion 116*b* has a similar flange that rests on the casing 110, and further includes a rear vertical flange 116*e* extending upward from the rear end and wraps partially around the side portions 116*c* to cooperate with the bag cover 102 to close off frame 101, as shown in FIG. 3. As shown best in FIGS. 14 and 19, the rear portion 116*b* has two offset holes 116*f* with each hole 116*f* receiving an associated link arm 161, 162 of the actuation assembly 105. Although, each hole 116*f* is shown as having a closed rectangular shape, each hole 116*f* can be open (i.e., extend through at least one side of the portion) and/or have another shape (e.g., slot, elliptical, etc.). The rear portion 116*b* includes a mount 116*g* for each hinge of the lid, as discussed below. As shown, each mount 116*g* has a generally rectangular projection, which extends upward from the top of the rear portion 116*b* to receive part of the hinge, and two circular projections, which extend upward form the top of the rear portion 116*b* and within the rectangular projection to receive fasteners for coupling the upper support 116 and the hinge, as discussed below.

Figure 28:
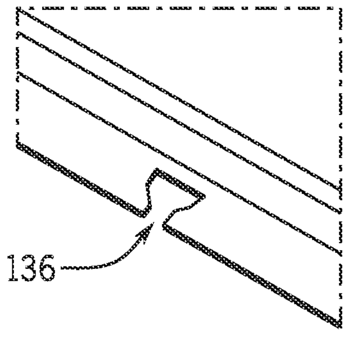
FIG. 28 is a detail view of a void for tying off trash bags to the trash can.

As shown best in FIG. 18, the liner 103 is generally a rectangular cuboid having an open top leading into a cavity to receive a trash bag and trash therein. The liner includes a front wall 131, a rear wall 132, a bottom wall 133 opposite the open top, and two opposing side walls 134 interconnecting the other walls. As shown best in FIGS. 10 and 11, the top of the liner 103 extends above (e.g., is proud of) the top of the casing 110 and above the front and side portions 116*a*, 116*c* of the upper support 116 by an offset distance, and the liner 103 includes a lip 135 (e.g., flange) that extends outwardly from the top of the walls of the liner 103. This arrangement advantageously makes it easier to access and replace the trash bag when desired, since the offset distance allows a user to replace the trash bag without moving or removing the liner 103 from the casing 110 and the upper support 116. The liner 103 can include features for securing the bag to the liner or a portion thereof. For example, a bell shaped void 136, as shown in FIG. 28, can be incorporated with part of the liner 103 (or other elements of the trash can) to tie off excess portions of trash bags that are non-standard sized (e.g., not 13 gallon bags). It is noted that the void 136 can be incorporated onto the upper support 116 in place of or in addition to the void on the liner 103.

Figure 6:
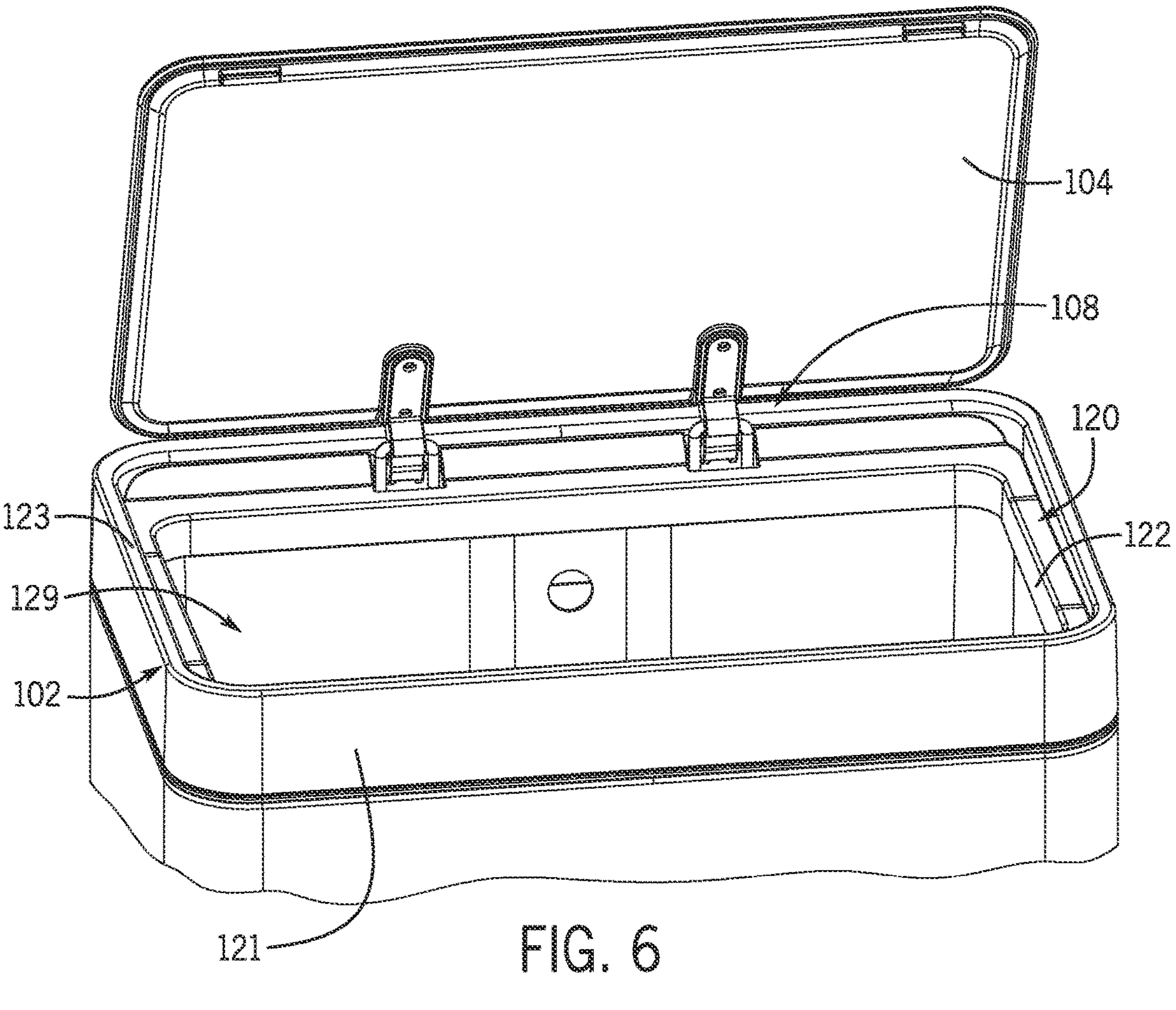
FIG. 6 is a perspective view of the trash can shown in FIG. 1 with the lid open.
Figure 8:
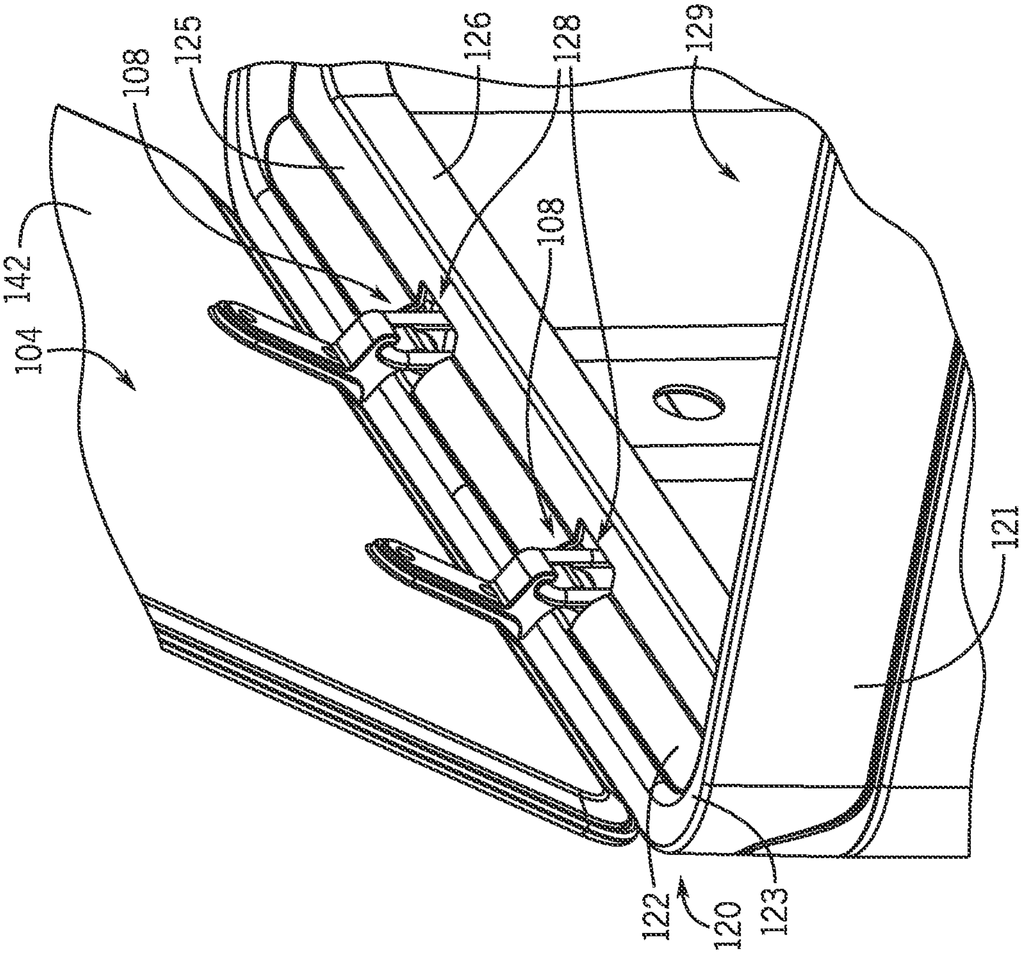
FIG. 8 is another perspective view of the trash can shown in FIG. 1 with the lid open.
Figure 20:
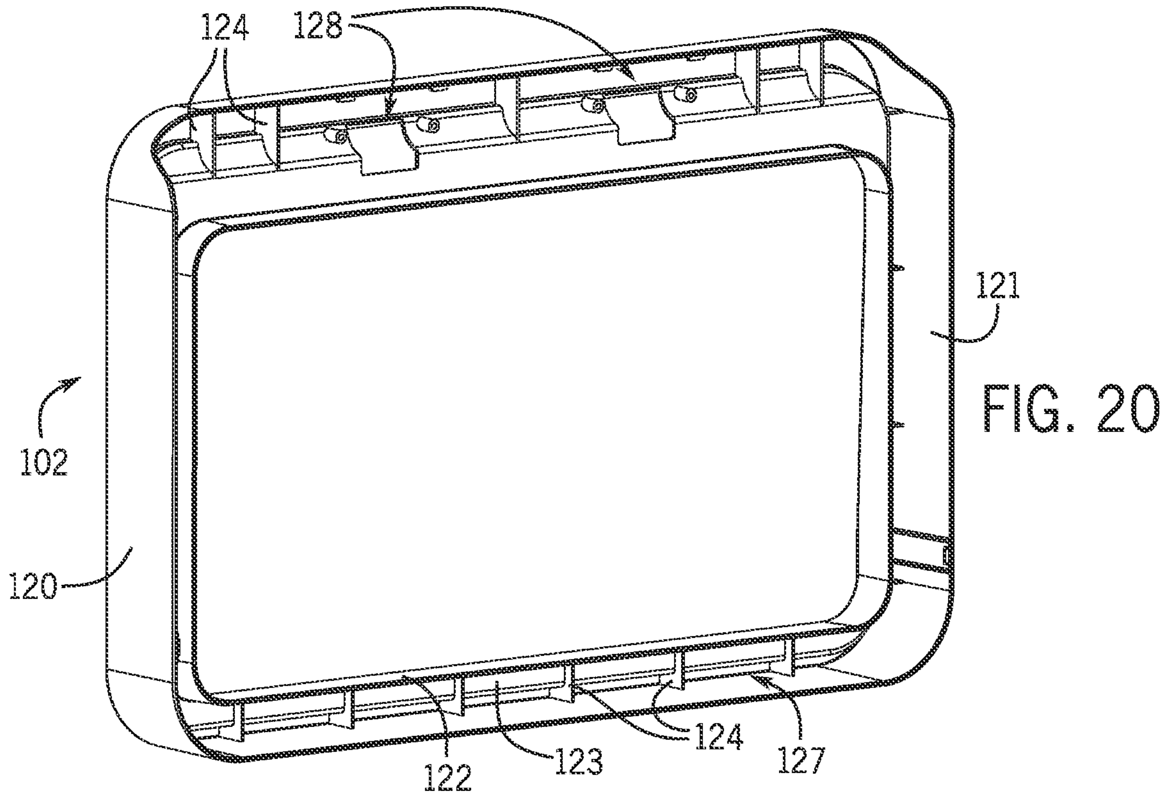
FIG. 20 is a perspective view of the bag cover of the trash can shown in FIG. 1.
Figure 21:
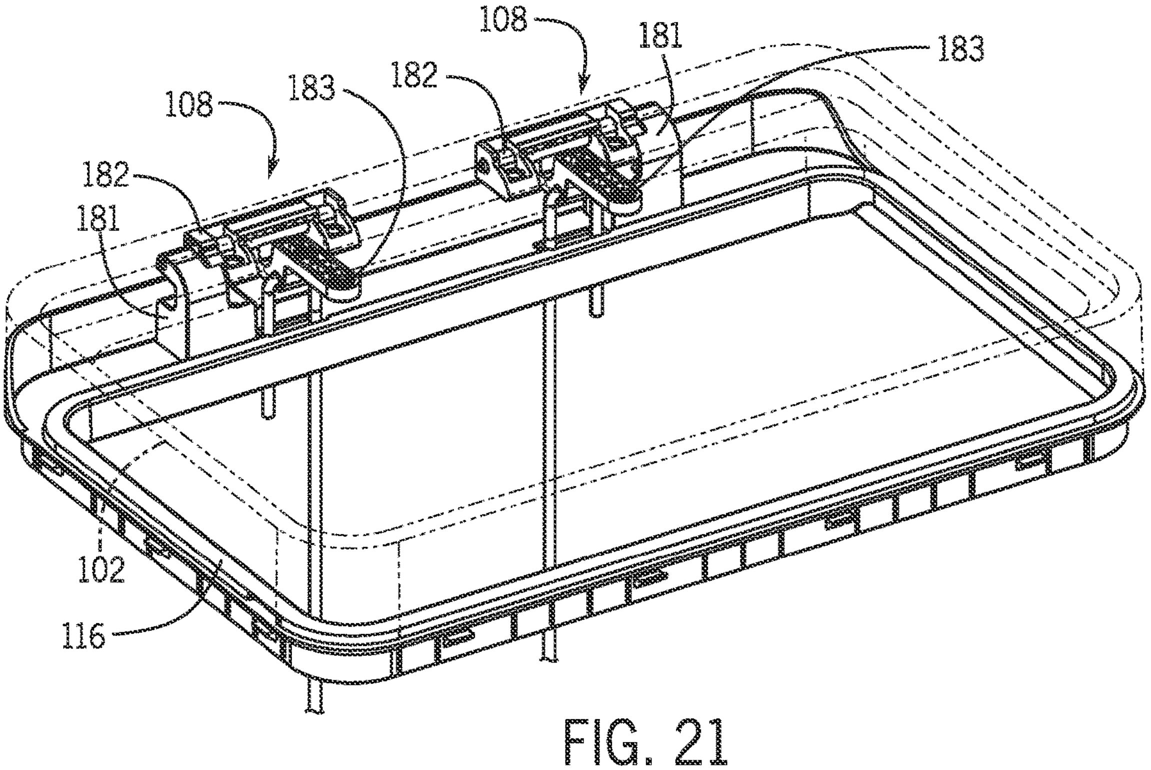
FIG. 21 is a top perspective view of a portion of the trash can shown in FIG. 1.

As shown best in FIGS. 6, 9, and 10, the bag cover 102 is rotatable relative to the casing 110 and the upper support 116 between a closed position covering/concealing the top of the liner 103 and part of the upper support 116, as shown in FIG. 6, and an open position allowing a user to access the liner 103 to remove and/or replace the trash bag coupled to the liner 103, as shown in FIG. 10. FIG. 9 shows the bag cover 102 in an intermediate position between the open and closed positions. As shown in FIGS. 6, 8, and 20, the bag cover 102 includes a generally rectangular ring shaped body 120 with a rectangular outer wall 121, a rectangular inner wall 122 offset inwardly from the outer wall 121, and a top wall 123 coupling the inner and outer walls together. The body 120 can optionally include one or more strengthening ribs 124 extending between the walls on the inside. As shown in FIG. 8, the body 120 includes a flange 125 extending inwardly from the inside of the inner wall 122 forming a recessed cavity for receiving the lid 104 when closed. The flange 125 extends around the entire inner periphery of the body 120 forming an inner ledge on which the lid 104 rests when closed. This arrangement advantageously allows the top of the lid 104 to sit flush with the top of the bag cover 102 when closed for a cleaner look. The body 120 can include another flange 126 that extends downwardly from the inner flange 125. As shown in FIG. 20, the body 120 has a channel 127 defined by any of the combined inner wall 122, outer wall 121, flange 125, and/or the flange 126, and the channel 127 receives and conceals the top of the liner 103 in the closed position of the bag cover 102. As shown best in FIGS. 8 and 20, the body 120 includes two spaced apart holes 128, where each hole 128 allows part of a hinge to pass through to couple to the lid 104. Each hole 128 is shown in FIG. 8 as a slotted hole extending through inner wall 122 and the flange 125, but it is noted that each hole 128 can extend a longer or shorter distance depending on the design. The body 120 includes a central opening 129 for accessing the trash bag, and the bag cover 102 is rotatable between open and closed positions through one or more hinges 108, which are discussed below.

Figure 1:
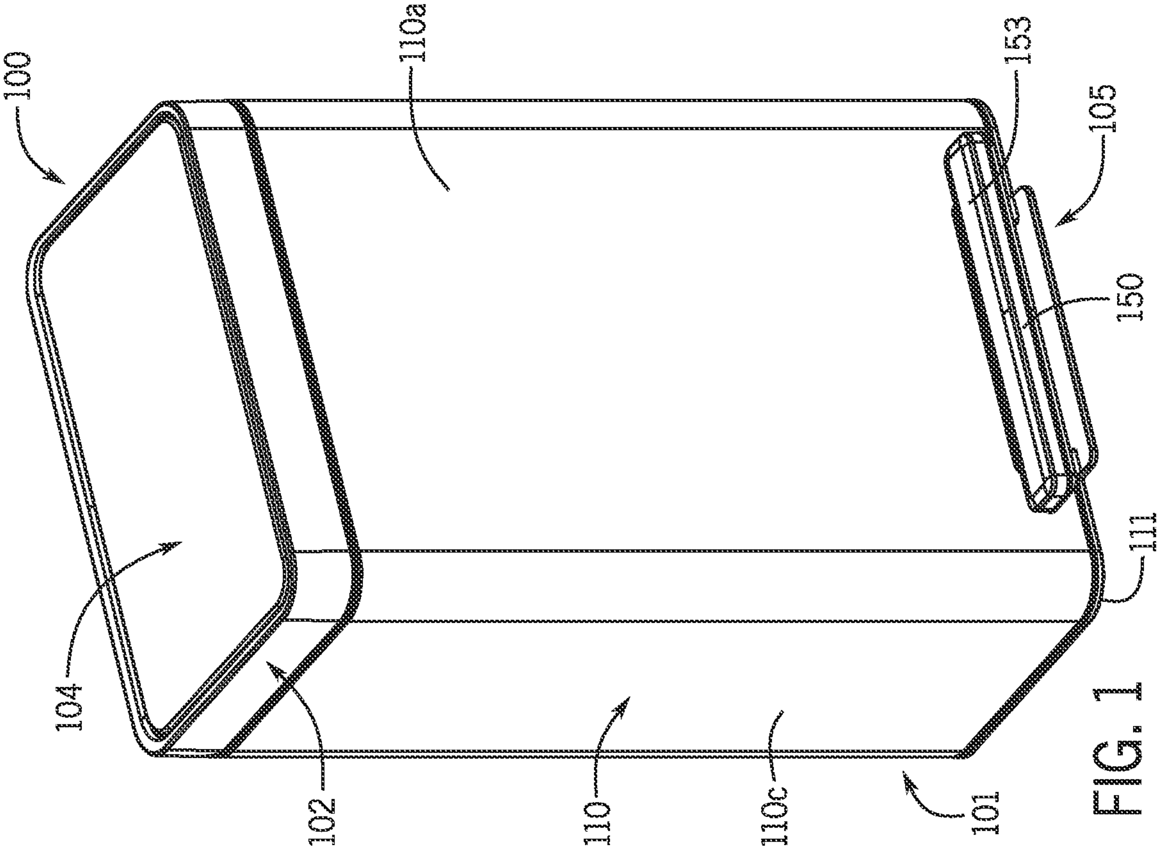
FIG. 1 is a perspective view of an exemplary embodiment of a trash can, according to this application.
Figure 4:
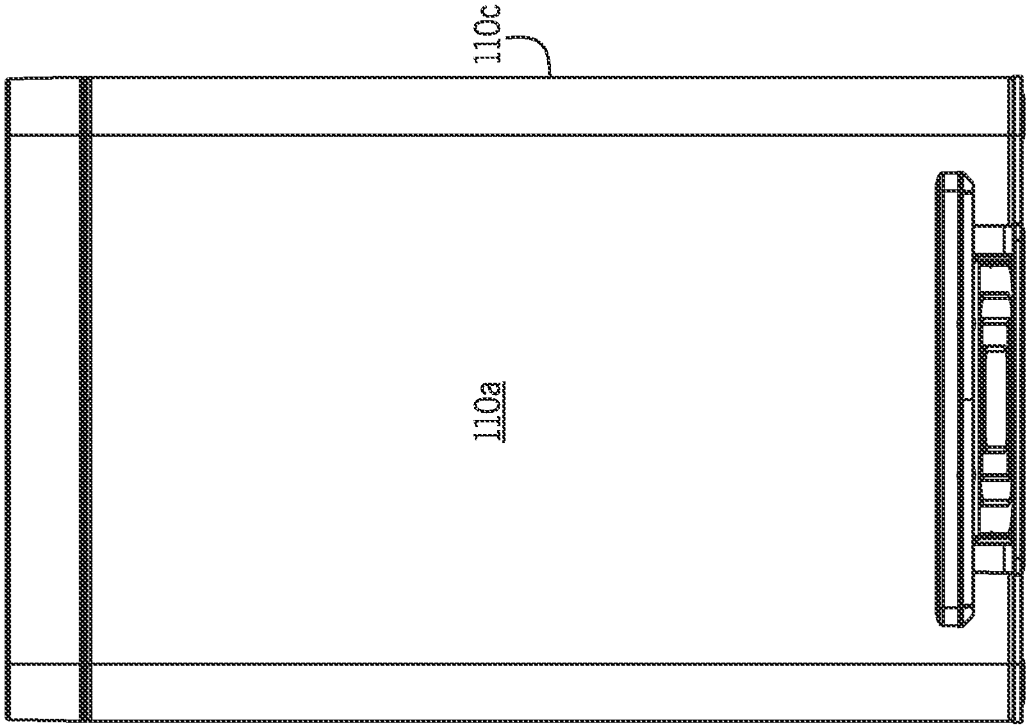
FIG. 4 is a front view of the trash can shown in FIG. 1.
Figure 7:
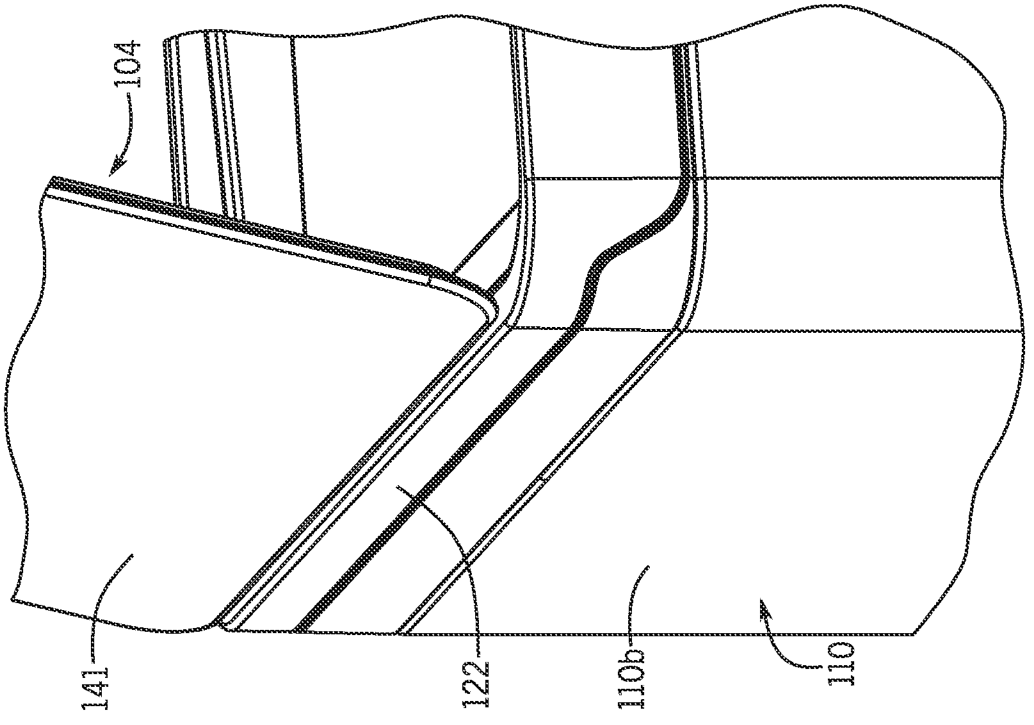
FIG. 7 is another perspective view of the trash can shown in FIG. 1 with the lid open.
Figure 11:
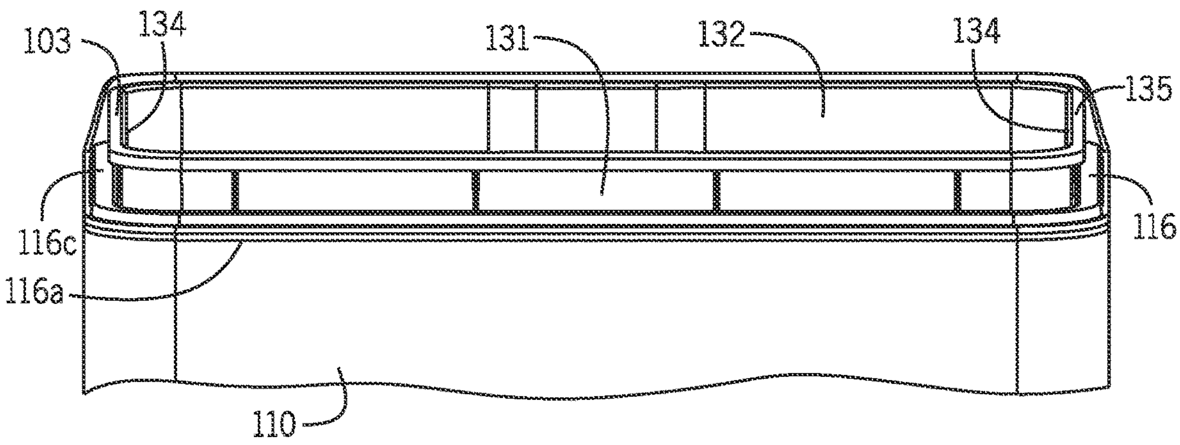
FIG. 11 is a perspective front view of the trash can shown in FIG. 1 with the lid and bag cover removed to show the liner extending above the casing.
Figure 12:
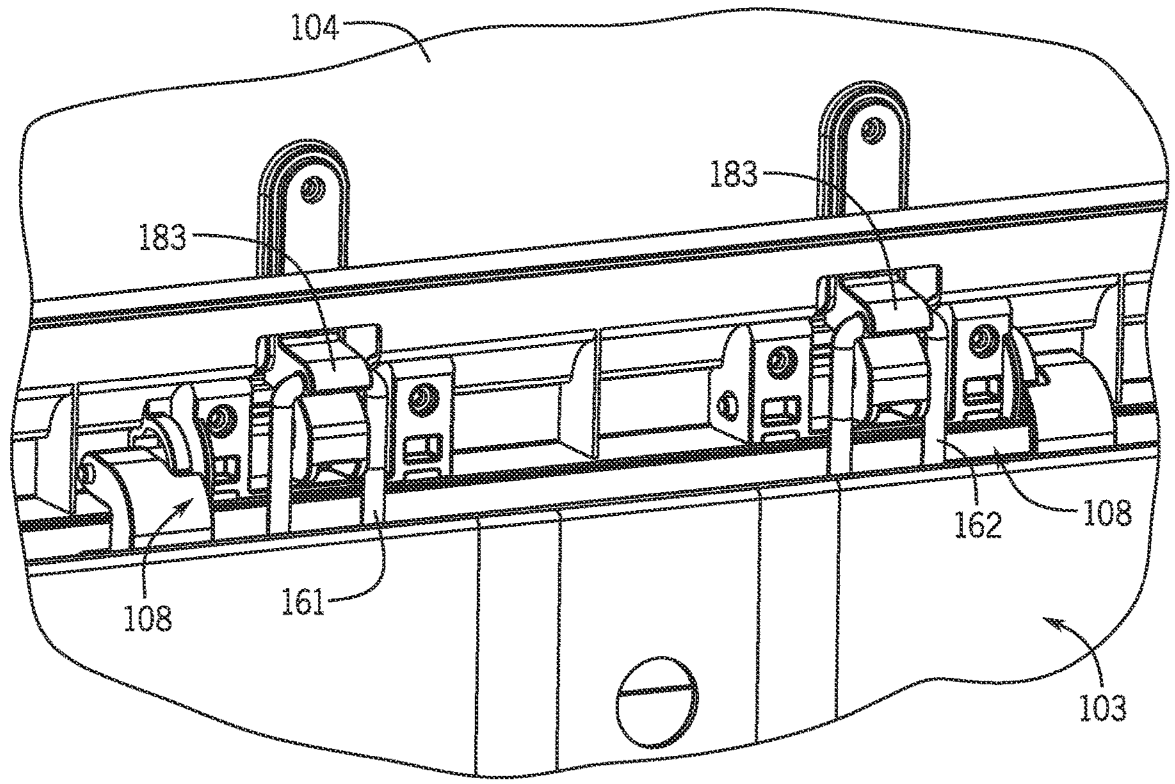
FIG. 12 is a detail view of a hinge of the trash can shown in FIG. 10 with the lid and bag cover open.
Figure 23:
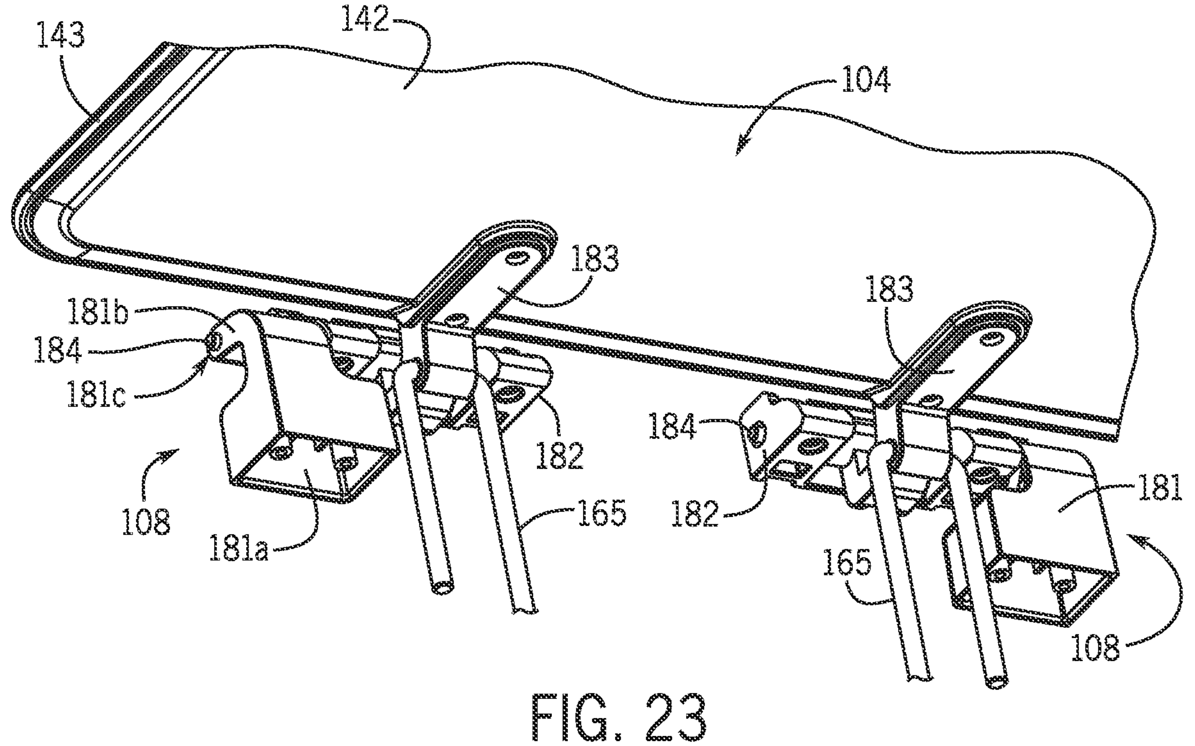
FIG. 23 is a top perspective view of a portion of the trash can shown in FIG. 1.
Figure 24:
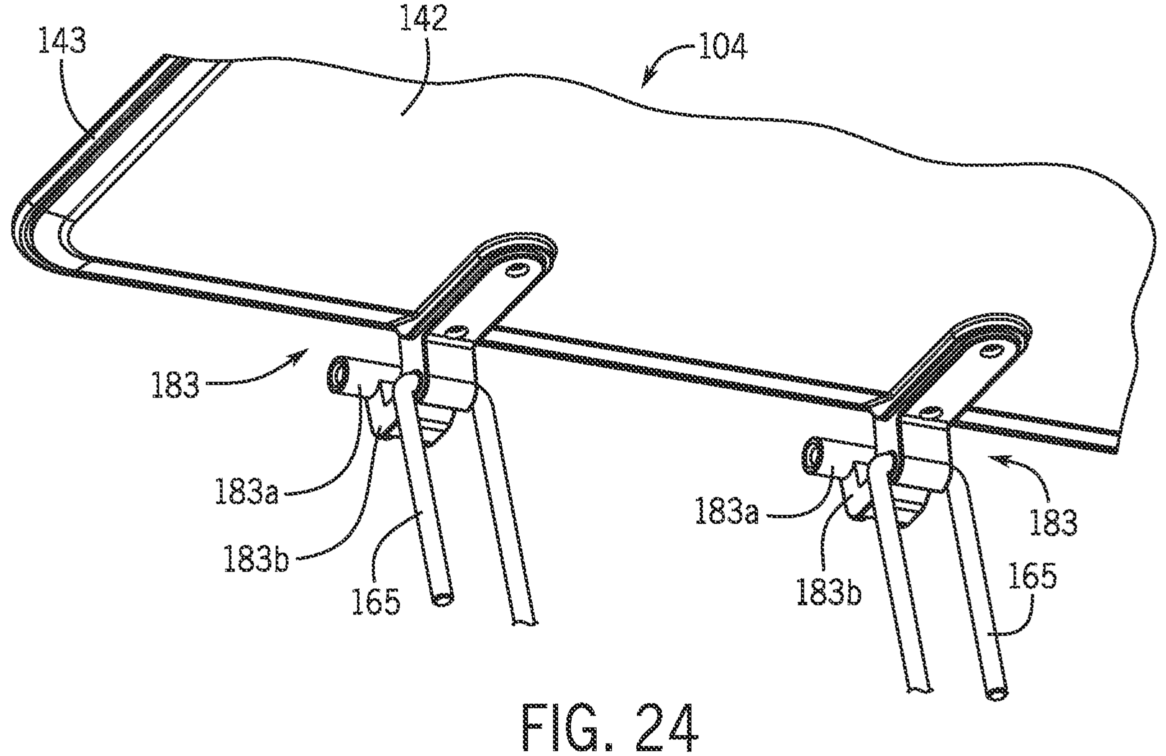
FIG. 24 is a top perspective view of a portion of the trash can shown in FIG. 1.
Figure 27:
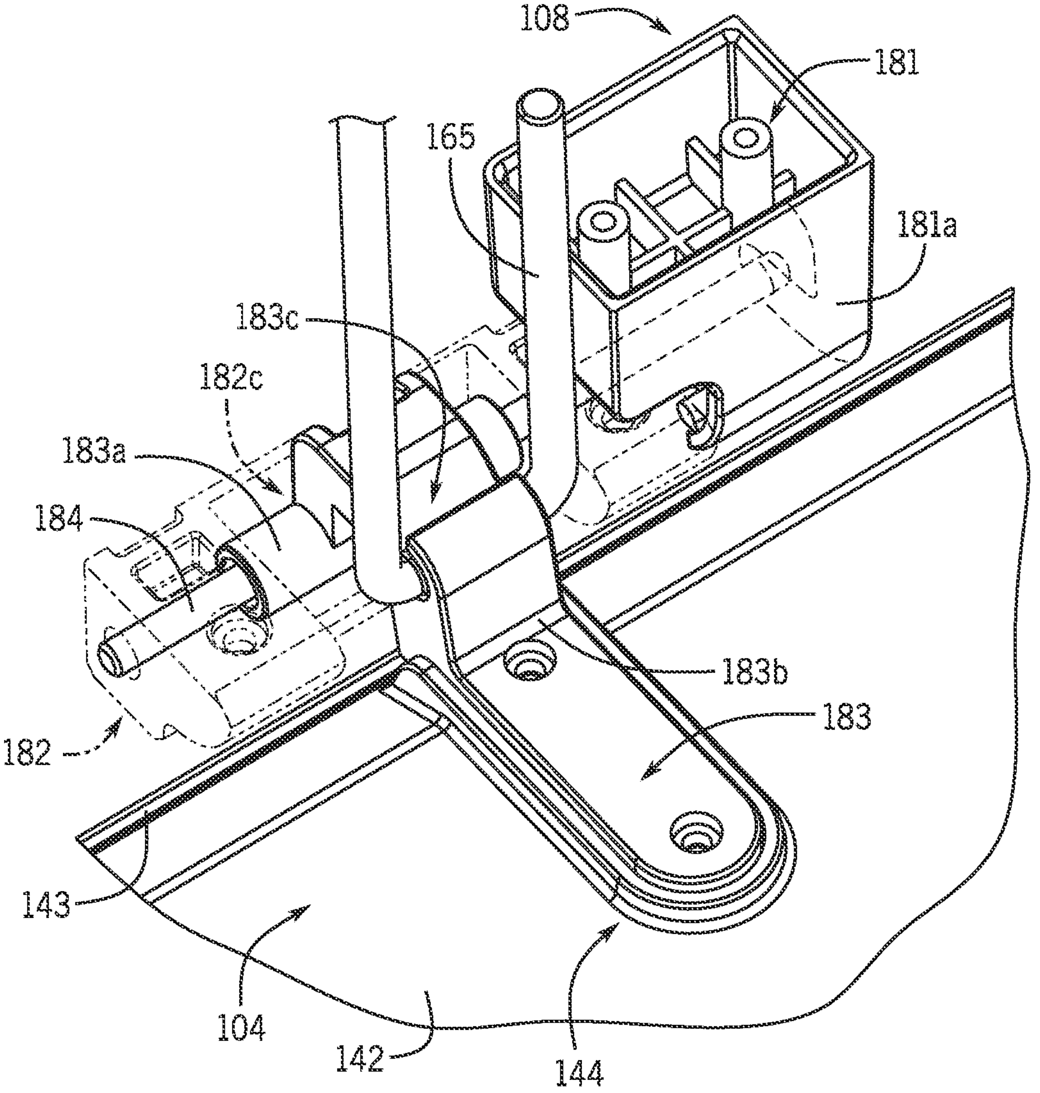
FIG. 27 is a bottom perspective view of a hinge of the trash can shown in FIG. 1.

As shown in FIGS. 2, 5, 23 and 24, the lid 104 has a generally rectangular shape for nesting in the cavity of the bag cover 102 in a closed position (shown in FIGS. 1 and 2). The lid 104 is rotatable through one or more hinges 108, which are discussed below, between the closed position and an open position (shown in FIGS. 6 and 7) to allow a user to discard trash into the trash bag coupled to the liner 103. The lid 104 includes a top surface 141 that is generally flush with the top of the top wall 123 in the closed position and is generally flush with or forward of the rear surface of the rear wall 110*b* of the casing 110 and/or the rear surface of the outer wall 121 of the bag cover 102 as shown in FIG. 7. As mentioned, this arrangement advantageously allows the trash can 100 to be positioned with its rear surfaces (e.g., casing, bag cover, etc.) right up to and against a wall or other vertically extending object, since the lid 104 does not rotate rearward of the rear surfaces. As shown in FIGS. 23 and 24, the lid 104 includes a bottom surface 142 that rests on the flange 125 either directly or indirectly through an intermediate layer of a material, such as a rubber (e.g., EPDM) or other suitable elastomer, that dampens vibration and deadens noise resulting from the closing of the lid 104 onto the bag cover 102. Also shown, the bottom surface 142 does not extend out as far as the top surface 141 around the periphery, thereby forming a lip 143 extending around the outer periphery of the lid 104. The lip 143 can rest in a complementing feature in the bag cover 102 with the bottom surface 142 disposed in part of the recessed cavity in the bag cover 102. As shown in FIG. 27, the lid 104 includes a mount 144 having a raised surface relative to the bottom surface 142 for mounting to part of a hinge 108 and an edge around the raised surface that is raised relative to the raised surface to locate the part of the hinge relative to the lid 104.

The trash can 100 includes hinges that rotatably couple the lid 104 to the frame 101 and rotatably couple the bag cover 102 to the frame 101 so that the lid 104 and bag cover 102 can rotate independently or simultaneously relative to the frame 101 between closed and open positions. As shown in FIGS. 8-10, two hinges 108 rotatably couple the lid 104 and the bag cover 102 to the frame 101. FIG. 8 shows the lid 104 rotated relative to the bag cover 102 and the frame 101 through the hinges 108, whereas FIG. 9 shows the bag cover 102 rotated relative to the lid 104 and the frame 101.

Figure 22:
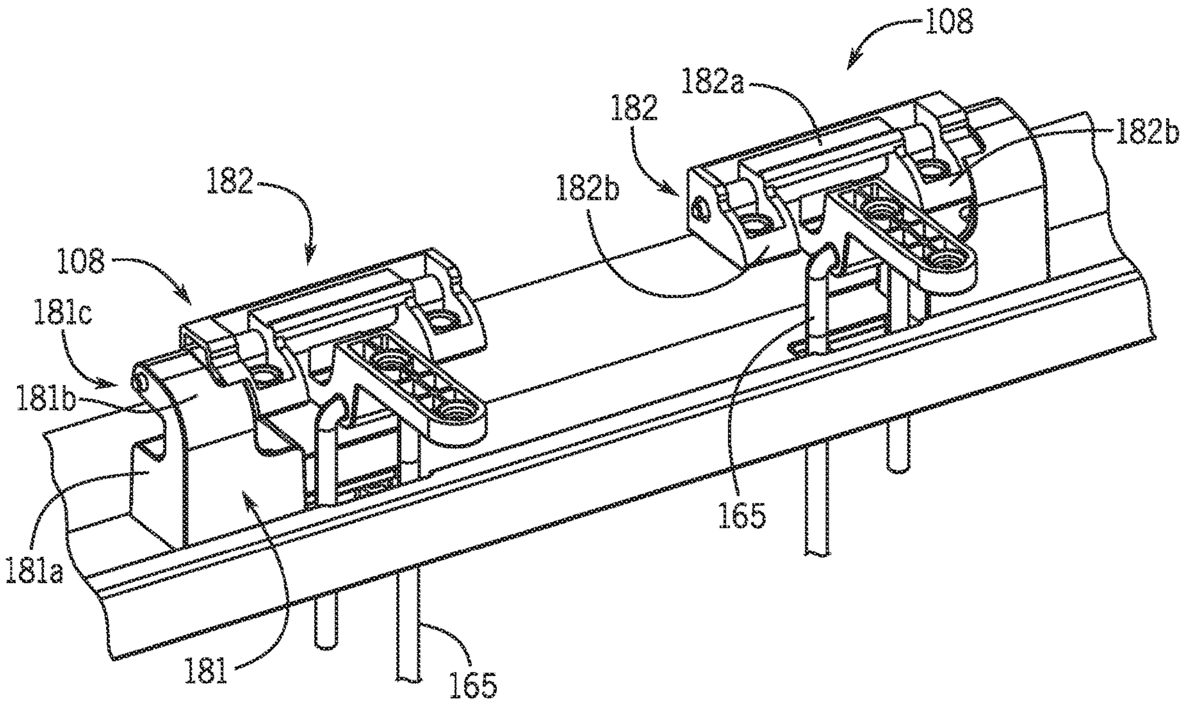
FIG. 22 is a top perspective view of a portion of the trash can shown in FIG. 1.
Figure 25:
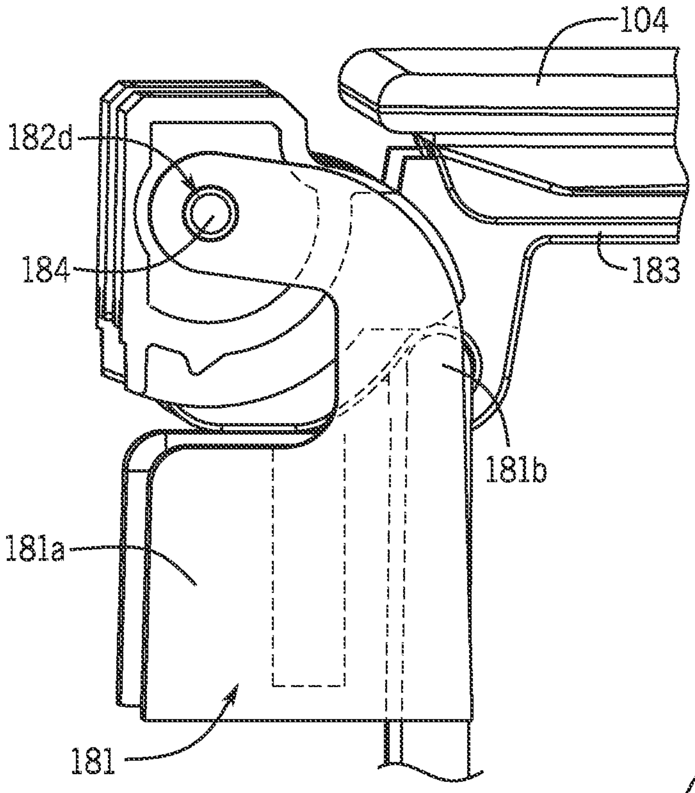
FIG. 25 is a side perspective view of a hinge of the trash can shown in FIG. 1.
Figure 26:
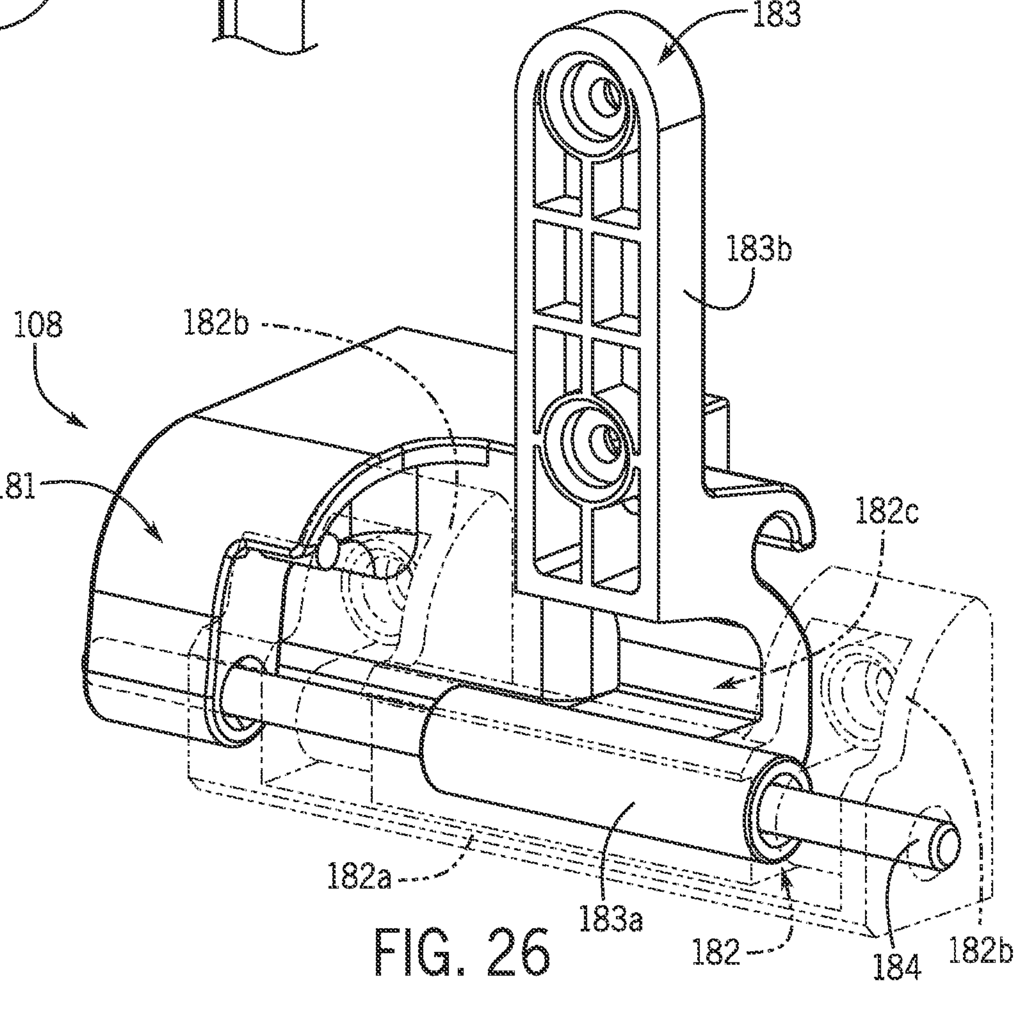
FIG. 26 is a side perspective view of a hinge of the trash can shown in FIG. 1.

As shown best in FIGS. 25-27, each hinge 108 includes a first (e.g., support) mount 181, a second (e.g., cover) mount 182, a third (e.g., lid) mount 183, and a pivot pin 184 rotatably coupling the mounts together. The support mount 181 is fixedly coupled to the upper support 116 and coupled to the pivot pin 184. As shown in FIG. 22, the support mount 181 includes a base 181*a* that is fixedly coupled to one mount 116*g* of the upper support 116, such as through fasteners. As shown in FIG. 27, the base 181*a* is generally rectangular and configured to complement the generally rectangular projection of the mount 116*g*. The support mount 181 also includes an arm 181*b* that extends from the base 181*a* and has a bore 181*c* that receives part of the pivot pin 184.

The cover mount 182 of each hinge 108 is fixedly coupled to the bag cover 102 and rotatably coupled to the pivot pin 184 to allow relative rotation of the bag cover 102 and the cover mount 182 about the pivot pin 184. As shown in FIGS. 22 and 26, the cover mount 182 includes a body 182*a* and two arms 182*b* extending from the body 182*a* forming a clevis shape. Each arm 182*b* is coupled to the bag cover 102, such as through one or more fasteners. One arm 182*b* nests with the associated support mount 181 of the hinge 108 such that the cover mount 182 and support mount 181 are located side by side while allowing for relative rotation of the cover mount 182 relative to the support mount 181 about the pivot pin 184. The body 182*a* has a notch 182*c* provided between the two arms 182*b* for receiving part of the lid mount 183, as discussed below. As shown in FIG. 25, a bore 182*d* extends through the cover mount 182 to receive a portion of the pivot pin 184.

The lid mount 183 of each hinge 108 is fixedly coupled to the lid 104 and rotatably coupled to the pivot pin 184 to allow relative rotation of the lid 104 and the lid mount 183 about the pivot pin 184. As shown in FIGS. 24 and 27, the lid mount 183 includes a hollow sleeve 183*a*, which is disposed in the notch 182*c* of the cover mount 182 and receives a portion of the pivot pin 184 to allow the lid mount 183 to pivot about the pivot pin 184, and a foot 183*b* extending away from the sleeve 183*a* in a transverse direction to a longitudinal direction of a bore in the hollow sleeve 183*a*. Part of the foot 183*b* is fixedly coupled to the lid 104, such as through one or more fasteners, so that the lid 104 and lid mount 183 rotate together about the pivot pin 184. The foot 183*b* includes an open circular notch 183*c* for receiving a link arm 161, 162 of the actuation assembly 105. The open notch 183*c* simplifies assembly since the link arm can be inserted into the notch 183*c* through the opening.

The pivot pin 184 rotatably couples both the lid mount 183 and the cover mount 182 to the support mount 181 so that the lid mount 183 and the cover mount 182 can rotate independently or simultaneously, depending on whether a user wants to rotate just one of the lid 104 and the bag cover 102 or both together. The pivot pin 184 includes a cylindrical shaped element that extends through the bore 181*c* in the support mount 181, the bore 182*d* in the cover mount 182, and a bore in the hollow sleeve 183*a* of the lid mount 183, such that the cover mount 182 and the lid mount 183 rotate about the same axis of rotation (defined by the cylindrical pivot pin 184) relative to the support mount 181 to in-turn rotate the cover mount 182 and lid 104, respectively. Thus, the bore 181*c* in the support mount 181, the bore 182*d* in the cover mount 182, and a bore in the hollow sleeve 183*a* of the lid mount 183 are substantially concentric to one another and use the same pivot. This arrangement advantageously reduces the packaging space required for each hinge while allowing the lid 104 and bag cover 102 to rotate to open positions that do not extend rearward of the rear surfaces of the casing 110 and/or the upper support 116.

The lid 104 and the lid mount 183 rotate together about the pivot pin 184 relative to the frame 101 and the support mount 181, which is fixedly coupled to the upper support 116 of the frame 101 to move the lid 104 between open and closed positions. As discussed below, the lid 104 can be moved (e.g., opened, closed) through the actuation assembly 105. The bag cover 102 and the cover mount 182 rotate together about the pivot pin 184 relative to the frame 101 and the support mount 181 to move the bag cover 102 between open and closed positions. As mentioned, the lid 104 and the bag cover 102 can be rotated independently from the other or can be rotated together at the same time.

The actuation assembly 105 includes a pedal 150 and one or more than one link arm (e.g., drive link, link, arm, etc.) connected to the pedal 150 and the lid mount 183 to drive movement of the pedal 150 to the lid mount 183 to move the lid 104. As shown in FIGS. 13-16, the actuation assembly 105 includes a first link arm 161, which is coupled to the pedal 150 at a first location and the lid mount 183 of one hinge 180 (e.g., the first hinge), and a second link arm 162, which is coupled to the pedal 150 at a second location and the lid mount 183 of the other hinge 180 (e.g., the second hinge). As shown, the first and second link arms 161, 162 are configured the same. Each link arm 161, 162 is an elongated rod having a center section 163, a lower end section 164 coupled to the pedal 150, and an upper end section 165 coupled to the lid 104 such that movement of the pedal 150 in turn moves the link arm, which in turn moves the lid 104. The center section 163 extends generally straight (FIG. 15 shows the center sections 163 extending straight, but it is noted that the center sections 163 can bow and still function properly as shown in FIG. 13). the lower end section 164 has a straight portion that extends from a bottom of the center section 163 and a transverse extension that together form an "L" shape (see FIGS. 16 and 17). The upper end section 165 has a first straight portion that extends from a top of the center section 163, a second straight portion extending parallel to and offset from the first straight portion, and a transverse extension interconnecting the straight portions to form a "U" shape (see FIGS. 23, 24, and 27). As shown best in FIG. 27, the "U" shaped upper end section 165 engages the notch 183*c* in the lid mount 183 so that movement of the link arm moves the lid mount 183 (and the lid 104 coupled thereto) through the upper end section 165.

As shown in FIG. 17, the pedal 150 is pivotally coupled to the base 112 of the frame 101 through a pivot 151, which has a center portion extending through a bore in the pedal 150 and has ends that are disposed in and supported by bores in the base 112. The pedal 150 includes a front portion 152 that is forward of the pivot 151 and includes a step portion 153 that extends forward of the both casing 110 and the base 112 allowing a person to step onto the front portion 152 to pivot the pedal 150 and move the lid 104. The lower portion 112*g* of the base 112 supports the front portion 152 of the pedal 150. The pedal 150 also includes a rear portion 155 that is rearward of the pivot 151 and is shown in FIG. 17 as being integral with the front portion 152. As shown in FIG. 16, a vertical portion 156 extends upwardly from the rear portion 155 within the cover 113. The lower end section 164 of each link arm 161, 162 is operatively coupled to the vertical portion 156 and/or the rear portion 155 of the pedal 150 to communicate movement from the pedal 150 to the lid 104 through the link arms 161, 162.

The lower end section 164 of each link arm 161, 162 is operatively coupled to the pedal 150 (e.g., the vertical portion 156) so that when a user steps on (or depresses downwardly) the step portion 153 of the pedal 150, the downward movement of the front portion 152 (and step portion 153) moves the rear and vertical portions 155, 156 upwardly from the pivoting of the pedal 150 about the pivot 151, which in turn moves the link arms 161, 162 upwardly through the lower end sections 164 to move the lid 104 (through the upper end sections 165 engaging the lid mounts 183 as discussed above).

During actuation (e.g., opening) of the lid 104, a user steps on (or depresses downwardly) the step portion 153 of the pedal 150 to pivot the front and step portions 152, 153 of the pedal 150 downward about the pivot 151, which in turn pivots the rear and vertical portions 155, 156 upwardly and moves the link arms 161, 162 upwardly through the coupled lower end sections 164. Upward movement of the link arms 161, 162 in turn moves the lid 104 open by moving the lid mount 183 with the upper end section 165 of the associated link arm 161, 162, which is engaged in the notch 183*c* of the lid mount 183. The upward movement of the upper end section 165 pivots the lid mount 183 (and lid 104 coupled thereto) about the axis of rotation, since the notch 183*c* is offset from the pivot pin 184 (and the axis of rotation).

The trash can 100 can include a damper to provide a damping force during movement of the lid 104. As shown in FIG. 16, a damper 109 is disposed within the cover 113 and is operatively coupled to the vertical portion 156 of the pedal 150 and the base 112 to provide a damping force during movement of the pedal 150 relative to the base 112. The cover 113 protects against the damper and the pedal 150 from being contacted by the liner, such as when removing and returning the liner in place. According to an exemplary embodiment, the damper 109 is a liquid (e.g., hydraulic) damper having a casing 190 that houses a piston and a liquid (e.g., oil) that is moved between chambers during movement such as across a single seal to provide the damping force. Other types of dampers can be used. Also shown in FIG. 16, a first end 191 of the damper 109 is disposed in the recess 112*h* (e.g., the recessed bore) in the base 112 to secure the first end 191 in place relative to the base 112, and a second end 192 of the damper 109 is operatively coupled to the vertical portion 156 of the pedal 150.

Figure 29:
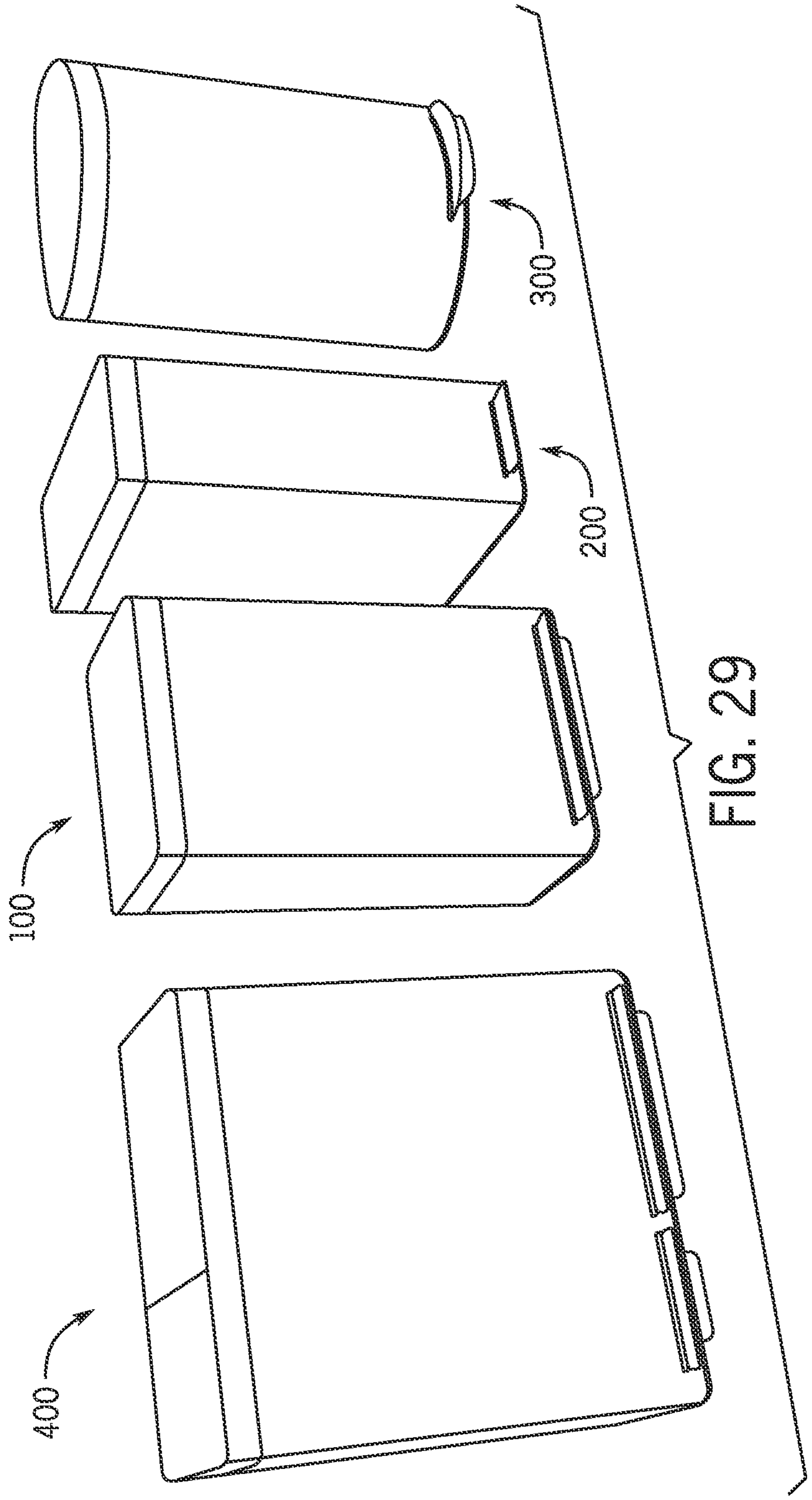
FIG. 29 is a perspective view showing several additional embodiments of trash cans, according to this application.

FIG. 29 illustrates three additional exemplary embodiments of trash cans that can be configured having the elements/components described above for the trash can 100. The trash can 100 is generally configured as a "wide" 13 gallon trash can, whereas the trash can 200 is similar to the trash can 100, except the trash can 200 is generally configured as a "narrow" 13 gallon trash can. The overall structural arrangement (e.g., elements/components) of the trash can 200 can be basically the same as the trash can 100 but narrowed width wise (e.g., in the lateral direction) and extended in the fore and aft direction to fit within different sized areas. The trash can 300 is generally configured as a "half round" 13 gallon trash can. The trash can 300 has a flat rear side and a semi-circular front side, but otherwise the structural arrangement of the trash can 300 can be similar to the trash can 100. The trash can 400 is a two-compartment version of the trash can 100 (which is a single compartment trash can), which can be used to separate trash and recycling or two different types of recycling (e.g., plastic from paper) as non-limiting examples. Therefore, the trash can 400 can include the same basic structural arrangement of the trash can 100, except having two liners, two lids, two actuation assemblies, etc. housed in one casing/frame, with one liner, one lid, and one actuation assembly associated with the first compartment and the other liner, lid and actuation assembly associated with the second compartment. It is noted that additional trash cans can be configured having three or more compartments disposed in the same casing/frame and having the same basic structural arrangement as disclosed in, for example, the other trash cans disclosed herein.

The various elements/components of the trash cans disclosed herein can be made from (or to include) one or more various materials that advantageously provide better cleanability and/or prevent or hide soiling. By way of example, one or more of the casing, the base, the liner, the lid, the bag cover, and the pedal can be made from or can include a steel (e.g., an uncolored stainless steel) having a gloss level from fourteen (14) up to and including twenty (20) at sixty degrees (60°). Even more specifically, the gloss level of the steel can be about seventeen (17) at sixty degrees. Also, by way of example, one or more of the elements of the trash cans disclosed herein be made from or can include a matte black stainless steel having a gloss level of between about twenty-two (22) and twenty-nine (29) at sixty degrees. Even more specifically, the gloss level of the matte black stainless steel can be about twenty-five (25) at sixty degrees. It is noted that the gloss levels provided herein are in accordance with the gloss level reading standards under ASTM D523. The inventors of this application found that the above noted gloss levels for the noted materials advantageously prohibit the appearance of fingerprints on the element(s)/component(s) of the trash can having the material(s). Thus, the element(s)/component(s) of the trash cans having the noted gloss levels can be handled without having to be cleaned (e.g., wiped) to remove the fingerprints, like with other gloss levels.

As utilized herein, the terms "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure, as well as the invention as recited in the appended claims.

The terms "coupled," "connected," and the like, as used herein, mean the joining of two members directly or indirectly to one another. Such joining may be stationary (e.g., permanent) or moveable (e.g., removable, releasable, etc.). Such joining may be achieved with the specified members or the specified members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The construction and arrangement of the elements/components of the trash cans as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples).

Other substitutions, modifications, changes and omissions may also be made in the design, operating conditions and arrangement of the various exemplary embodiments without departing from the scope of the present disclosure (e.g., the claims). For example, any element (e.g., frame, bag cover, liner, lid, actuation assembly, hinge, etc.) disclosed in one embodiment may be incorporated or utilized with any other embodiment disclosed herein. Also, for example, the order or sequence of any process or method steps may be varied or re-sequenced according to alternative embodiments.

It is further noted that any means-plus-function language (or the like) is intended to cover the structures described herein as performing the recited function and not only structural equivalents but also equivalent structures.

What is claimed is:

1. A trash can, comprising:

a frame comprising a base, a casing supported on the base, and an upper support coupled to the casing;

a bag cover rotatably coupled to the upper support via a hinge; and a lid coupled to and rotatable relative to the frame about the hinge;

wherein the hinge is located forward of a rearmost surface of the frame;

wherein the lid and the bag cover are independently rotatable between a respective open position and a respective closed position; and wherein the lid does not extend rearward of the rearmost surface of the frame in the open position, and wherein the bag cover does not extend rearward of the rearmost surface of the frame in the open position.

2. The trash can of claim 1, wherein the lid and the bag cover are independently rotatable about a common axis of rotation, wherein the axis of rotation is forward of the rearmost surface of the frame.

3. The trash can of claim 1, wherein the hinge comprises:

a support mount fixedly coupled to the frame;

a lid mount rotatably coupled to the support mount and fixedly coupled to the lid; and a cover mount rotatably coupled to the support mount and fixedly coupled to the bag cover.

4. The trash can of claim 3, wherein the support mount is fixedly coupled to the upper support of the frame.

5. A trash can, comprising:

a frame comprising a base and a casing supported on the base;

a bag cover pivotably coupled to the frame;

an upper support coupled to the casing, the upper support having a front portion, a rear portion, and a flange extending upwardly from the rear portion, the flange having a back surface parallel with a rear surface of the casing;

a lid coupled to and rotatable relative to the frame between a closed position and an open position; and a hinge coupled to the bag cover, the upper support, and the lid to rotatably couple the bag cover and the lid to the frame.

6. The trash can of claim 5, wherein the bag cover and the lid are independently rotatable about a common axis of rotation.

7. The trash can of claim 5, wherein the bag cover comprises an outer wall and an inner wall offset inwardly from the outer wall.

8. The trash can of claim 7, wherein the bag cover includes a recessed cavity between the outer wall and the inner wall, and wherein the lid is configured to nest in the recessed cavity in the closed position.

9. The trash can of claim 8, wherein a top of the lid is substantially flush with a top of the bag cover when the lid is in the closed position.

10. The trash can of claim 8, wherein an inner ledge extends in the recessed cavity between the outer wall and the inner wall, and wherein the lid is configured to rest on the inner ledge in the closed position.

11. The trash can of claim 10, wherein a channel is defined between the outer wall, the inner wall, and the inner ledge, the channel being on an opposite side of the inner ledge from the recessed cavity.

12. The trash can of claim 7, wherein the inner wall defines an opening of the bag cover.

13. The trash can of claim 12, wherein the lid is configured to cover the opening in the closed position and reveal the opening in the open position.

14. The trash can of claim 5, further comprising an actuation assembly operably coupled to the hinge, the actuation assembly comprising a pedal actuatable to cause movement of the lid from the closed position to the open position.

* * * * *